US012579185B1

(12) United States Patent
Cross et al.

(10) Patent No.: US 12,579,185 B1
(45) Date of Patent: Mar. 17, 2026

(54) PERSONA IDENTIFICATION BASED ON COMPARISON OF ENTITIES

(71) Applicant: Amazon Technologies, Inc., Seattle, WA (US)

(72) Inventors: Andrew David Cross, San Antonio, TX (US); Gerard Guy Medioni, Los Angeles, CA (US); Saurabh Gupta, Edmonds, WA (US); Yanhao Chen, San Jose, CA (US); Muhammad Tauseef Ulislam, Redmond, WA (US); Yow-Hann Lee, Lakewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 18/523,759

(22) Filed: Nov. 29, 2023

(51) Int. Cl.
*G06F 16/00* (2019.01)
*G06F 16/58* (2019.01)

(52) U.S. Cl.
CPC ................................... *G06F 16/58* (2019.01)

(58) Field of Classification Search
CPC ............................... G06F 16/05; G06F 16/58
See application file for complete search history.

(56) References Cited

U.S. PATENT DOCUMENTS

| | | | |
|---|---|---|---|
| 9,319,782 B1 | 4/2016 | Crump et al. | |
| 9,916,839 B1 | 3/2018 | Scalise et al. | |
| 11,523,049 B1 | 12/2022 | Tharakraj et al. | |
| 2003/0016247 A1 | 1/2003 | Lai et al. | |
| 2011/0093598 A1* | 4/2011 | Baratz ................. | H04L 65/1094 709/227 |
| 2011/0246950 A1 | 10/2011 | Luna et al. | |
| 2013/0282819 A1* | 10/2013 | Mehta ................... | G06Q 50/01 709/204 |
| 2017/0064004 A1 | 3/2017 | Volkmer | |
| 2017/0217145 A1 | 8/2017 | Yufu | |
| 2020/0293260 A1 | 9/2020 | Fitzgerald et al. | |
| 2022/0101382 A1* | 3/2022 | Baldwin ........... | G06Q 30/0269 |
| 2023/0281885 A1 | 9/2023 | Park et al. | |
| 2024/0146779 A1 | 5/2024 | Ayanoglu et al. | |
| 2024/0420400 A1 | 12/2024 | Iwaki | |
| 2025/0173952 A1 | 5/2025 | Black et al. | |

FOREIGN PATENT DOCUMENTS

| | | |
|---|---|---|
| AU | 2019380367 B2 | 5/2021 |
| EP | 3070876 A1 | 9/2016 |

* cited by examiner

*Primary Examiner* — Dinku W Gebresenbet
(74) *Attorney, Agent, or Firm* — Knobbe, Martens, Olson & Bear, LLP

(57) ABSTRACT

Systems and methods are provided to assign personas to identified entities based on entity data. A system can obtain image data and identify a first entity within the image data. The system can obtain entity data indicating one or more entities and one or more personas assigned to each entity of the one or more entities. Based on obtaining the entity data, the system can compare the first entity to the one or more entities and identify a second entity, from the one or more entities, that corresponds to the first entity. Based on identifying the second entity, the system can determine a persona assigned to the second entity and assign the persona to the first entity.

20 Claims, 9 Drawing Sheets

Welcome John Doe

500

ROUTINE FOR SYNCHRONIZED OUTPUT VIA IN-ROOM DEVICES — 800

IDENTIFY SENSOR DATA — 802

IDENTIFY DEVICE PARAMETERS OF A PLURALITY OF DEVICES — 804

ROUTE THE SENSOR DATA TO THE PLURALITY OF DEVICES — 806

SYNCHRONIZE OUTPUT OF ONE OR MORE FIRST DEVICES OF THE PLURALITY OF DEVICES — 808

END — 810

PERSONA IDENTIFICATION BASED ON COMPARISON OF ENTITIES

BACKGROUND

Conferencing systems (e.g., videoconferencing systems) enable entities to communicate in real time via a network. Such systems may obtain image data and audio data from sensors, process the data to generate an output, and transmit the same output to output devices. For example, the systems can obtain audio data from one device connected to the conferencing system and transmit a same output based on the audio data to each other device connected to the conferencing system. As multiple devices may be located at the same location, obtaining data and transmitting the same output based on the data in such a manner can increase resource utilization and can negatively impact the user experience. In some cases, prior to initializing communication between entities, the systems can obtain credentials (e.g., a username and a password) and login an entity using the credentials. However, the use of such a process can be time-consuming, resource-intensive, and inefficient.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
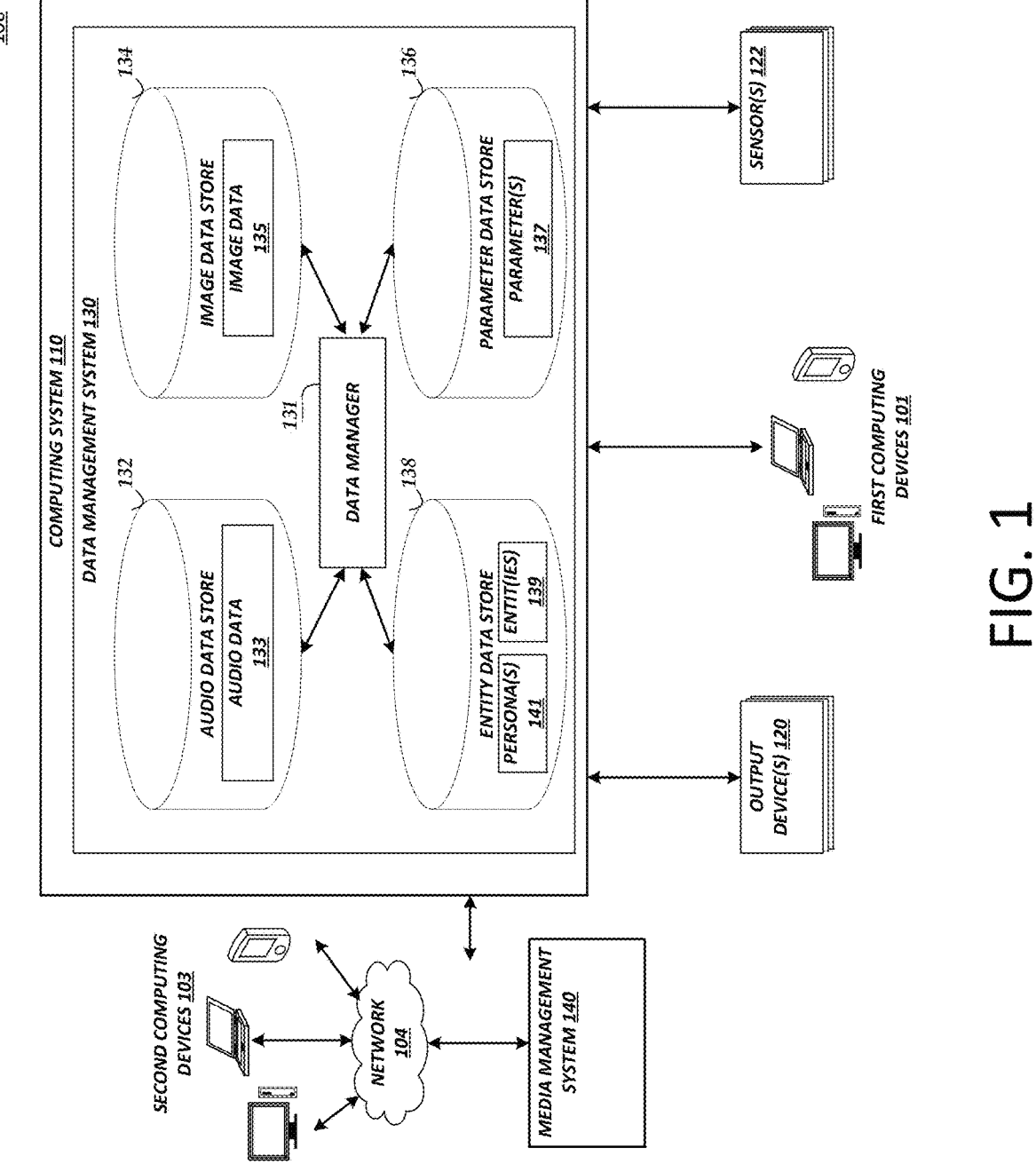
FIG. 1 is a block diagram depicting an illustrative environment in which a data management system can process data obtained from and/or to be routed to computing devices and manage assignment of personas to entities.

Generally described, aspects of the present disclosure relate to the receiving of data (e.g., audio data, image data, etc.) from one or more first computing devices, processing the data to generate an output, and routing the output to one or more second computing devices as part of a conference (e.g., a meeting, a call, a conferencing event, etc.). The data may be processed based on device parameters (e.g., a location, a role, a position, a function, an assignment, etc. associated with a device providing and/or obtaining the data) and/or persona parameters (e.g., a timing, a brightness, a contrast, a speed, a pitch, a volume, a language, an intensity, etc. associated with a persona of an entity associated with the data). For example, a computing system (e.g., a conferencing system) may be in communication with all or a portion of the computing devices and may facilitate communication (e.g., conferencing) between all or a portion of the computing devices (e.g., in conjunction with a media management system). To facilitate communication between all or a portion of the computing devices, the computing system may obtain data associated with (e.g., from) a first computing device, process the data to generate an output, and provide the output for transmission to a second computing device.

Using the obtained data, the computing system may identify entities (e.g., figures, users, people, etc.) associated with all or a portion of the computing devices (e.g., using image data). The computing system may identify a persona (e.g., profile, credentials, identifier, etc.) associated with (e.g., assigned to, to be assigned to, linked to, etc.) all or a portion of the identified entities using entity data. For example, the computing system may identify entities within image data captured by all or a portion of the computing devices and assign a respective persona to all or a portion of the entities.

Based on a particular persona, the computing system may process sensor data obtained from or to be routed to a computing device associated with the particular persona. For example, based on one or more personas, the computing system may process sensor data obtained from a first computing device (or from a first computing device via a media management system) associated with a first persona of the one or more personas for generation of an output that is to be routed to a second computing device associated with a second persona. For example, the computing system may process the sensor data based on persona parameters associated with the one or more personas. Such a processing of the sensor data enables an improved user experience and enables a customized experience for an entity based on the persona assigned to the entity. For example, such a processing of the sensor data enables the computing system to process sensor data using the same persona parameters for different computing devices associated with the same persona (e.g., in the event that an entity switches computing devices). In another example, such a processing of the sensor data enables the computing system to process sensor data received over a period of time using the same persona parameters. More specifically, embodiments of the present disclosure relate to improving the effectiveness of a computing system (e.g., a conferencing system) for particular entities such that the computing system can provide a customized user experience based on persona parameters associated with the entity.

In addition to or instead of processing sensor data based on persona parameters, the computing system can process sensor data and/or modify how computing devices provide an output based on device parameters of the computing device obtaining the output from and/or routing sensor data to the computing system (e.g., from and/or to the computing system via a media management system). Such a processing of the sensor data enables the computing system to process sensor data associated with multiple computing devices that have one or more of the same device parameters in a similar manner. In some cases, the computing system may enable a synchronized output (e.g., of audio, one or more images, etc.) by one or more computing devices that have one or more of the same device parameters. For example, the computing system can synchronize one or more computing devices located at the same location (e.g., as indicated by one or more device parameters) to provide a synchronized output based on the sensor data. Such a processing of the sensor data enables an improved user experience and enables multiple computing devices that have the same one or more device parameters (e.g., a location) to avoid providing unsynchronized output which may cause disjointed experiences (e.g., different experiences, disparate experiences, etc.) for entities. More specifically, embodiments of the present disclosure relate to improving the usability and effectiveness of a computing system (e.g., a conferencing system) such that the computing system can provide synchronized output for multiple computing devices.

As described in detail herein, a computing system may provide a service enabling such a processing of sensor data based on particular parameters (e.g., persona parameters of a persona associated with a first computing device providing the data, persona parameters of a persona associated with a second computing device obtaining an output based on the data, device parameters associated with the first computing device, and/or device parameters associated with the second computing device, etc.) to generate an output to provide to one or more computing devices and/or output devices. The computing system may obtain the sensor data from one or more first computing devices and the computing system may process the sensor data based on one or more first device parameters associated with the one or more first computing devices and/or one or more first persona parameters associated with one or more personas of one or more entities associated with the one or more first computing devices to generate an output. Further, the computing system may identify one or more second computing devices to obtain the output and the computing system may process the output based on one or more second device parameters associated with the one or more second computing devices and/or one or more second persona parameters associated with one or more personas of one or more entities associated with the one or more second computing devices to further generate the output.

In some cases, the computing system can cause the one or more second computing devices to provide the output. The computing system can further synchronize one or more components of the one or more second computing devices such that one or more second computing devices provide the output in a synchronized manner. For example, the computing system may synchronize speakers of computing devices to output audio in a synchronized manner.

One issue that may be of particular concern in conferencing systems is the difficulty in providing a seamless experience for users connected via computing devices. Many conferencing systems (e.g., media management systems) may link computing devices and enable the computing devices to transmit sensor data to and/or obtain an output from other computing devices. For example, a conferencing system may link a plurality of computing devices (e.g., for a video conference) and the conferencing system may obtain sensor data from a computing device and provide an output based on the sensor data to each other computing device of the plurality of computing devices. Further, the conferencing system may provide the same output to each other computing device of the plurality of computing devices.

By providing the same output to each other computing device of the plurality of computing devices, the conferencing system may cause substantial issues. For example, one or more computing devices of the plurality of computing devices may have the same one or more device parameters (e.g., may be located in the same location). If the one or more computing devices having the same one or more device parameters receive the same output as computing devices not having the same one or more device parameters, the conferencing system may cause a disjointed, ineffective experience for entities. For example, if one or more first computing devices located at a first location provide 1) an output synchronized with the output provided by one or more second computing devices not located at the first location (e.g., located at second location) and/or 2) an output that is not synchronized with the output provided by each other computing device of the one or more first computing devices, the output may be ineffective.

The output by all or a portion of the one or more first computing devices may conflict (e.g., be suppressed, cause feedback, cause static, cause an echo, cause crackling, etc.) with the output provided by other computing devices of the one or more first computing devices and/or the output by all or a portion of the one or more second computing devices may be ineffective (e.g., may be incomplete, may be unintelligible, may be unclear, etc.). The issues with the outputs may cause cascading (cumulative) issues and/or may reduce the functionality of the conferencing system (e.g., the conferencing system may provide an ineffective conferencing experience) which may result in an undesirable user experience. For example, the issues may cumulatively grow as computing devices are added to the one or more first computing devices located in the same location (e.g., in-room). Additionally, synchronizing the output of each computing device with each other computing device (regardless of the associated device parameters) may be inefficient and resource intensive.

In another example, all or a portion of the plurality of computing devices may be associated with an entity (e.g., the entity is utilizing the computing device) and each entity may be assigned a persona having one or more persona parameters. As discussed above, if a computing device associated with a first entity assigned a first persona is provided the same output as a computing device associated with a second entity assigned a second persona, the conferencing system may cause an ineffective experience. For example, a first persona may be associated with one or more first persona parameters (e.g., first image processing parameters, first timing parameters, first audio processing parameters, etc.) based on the requirements of an entity assigned the first persona and a second persona may be associated with one or more second persona parameters (e.g., second image processing parameters, second timing parameters, second audio processing parameters, etc.) that are different as compared to the one or more first persona parameters and that are based on the requirements of an entity assigned the second persona. An output based on sensor data processed according to one or more first persona parameters may not cause issues for a first computing device (and a first entity) but may cause issues for a second computing device (and a second entity). For example, the output may be too loud, too fast, too slow, etc. These issues may reduce the functionality of the conferencing system (e.g., the conferencing system may provide an ineffective conferencing experience) which may result in an undesirable user experience for particular entities as compared to other entities.

In some cases, a conferencing system may include a shared computing device for multiple entities. For example, the conferencing system may provide the output via a shared output device (e.g., a television, a speaker, etc.). However, by providing the output via a shared output device, the conferencing system may not be able to obtain personalized sensor data associated with all or a portion of the entities (e.g., audio from each of the entities). Further, the output provided to the entities may not be customized according to the persona parameters associated with particular entities. This may cause an ineffective and undesirable user experience.

Another issue that may be of particular concern in conferencing systems is the complexity and unwieldy nature of joining (e.g., logging into) a conference. For example, in conferencing systems, a user may provide credentials (e.g., a username and a password), an identifier of particular parameters, etc. to join the conference. Such a process may be time-consuming and ineffective which may reduce the functionality of the conferencing system and result in an undesirable user experience.

Embodiments of the present disclosure address the above-noted problems by enabling a data management system to process sensor data and provide an output (e.g., processed sensor data) based on processing the sensor data to a computing device. For example, the data management system may facilitate communications between a plurality of computing devices (e.g., as part of a conferencing system). The data management system may obtain sensor data from one or more first computing devices of the plurality of computing devices, generate an output based on the sensor data, and route the output to one or more second computing devices of the plurality of computing devices.

The data management system may process the sensor data and/or generate the output based on 1) device parameters and/or persona parameters of the one or more first computing devices and/or 2) device parameters and/or persona parameters of the one or more second computing devices. For example, the device parameters may be parameters such as a location of the computing device (e.g., in-room, remote, etc.), a role of the computing device (e.g., hardwired display, personal user computing device, etc.), a position of the computing device (e.g., closed, open, engaged, disengaged, etc.), a function of the computing device (e.g., full functionality, limited functionality or interactivity, etc.), and/or an assignment of the computing device (e.g., assigned to a particular entity, assigned to a group of entities, etc.). The persona parameters may be parameters such as a timing (e.g., audio output timing, image output timing, etc.), a brightness (e.g., 20 lumens, 40 lumens, etc.), a volume (e.g., 40 decibels, 50 decibels, etc.), a contrast (e.g., high contrast, low contrast, etc.), a speed (e.g., audio output speed, image output speed, etc.), etc.

The use of such parameters provides additional advantages as compared to traditional systems by customizing the data transmitted to the computing devices while also retaining the advantages of a conferencing system that enables the rapid transmission of data between computing devices in real time as part of a conference (e.g., a meeting). Additionally, the use of such parameters can provide an improved user experience as compared to traditional systems.

More specifically, embodiments of the present disclosure enable a computing system to obtain sensor data via a plurality of sensors. For example, the plurality of sensors may be implemented via a plurality of computing devices. In some cases, the plurality of sensors may include one or more image sensors and/or one or more microphones.

The computing system may obtain the sensor data based on initiation of a conference. For example, the computing system may determine initiation of the conference by a computing device of a plurality of computing devices and may obtain sensor data based on the initiation of the conference.

The computing system may utilize the sensor data to identify entities (e.g., entities attending the conference) and assign personas to all or a portion of the entities. The computing system may obtain the sensor data and identify entities within the sensor data. For example, the computing system may obtain the sensor data and identify an entity within an image frame of the sensor data.

Based on identifying the entity, the computing system may analyze the entity using entity data. For example, the entity data may indicate a plurality of entities and may indicate one or more personas assigned to all or a portion of the plurality of entities. The computing system may perform image comparison between the entity and all or a portion of the plurality of entities.

Based on the image comparison, the computing system may determine whether a correspondence (e.g., a similarity, a resemblance, a likeness, a degree of similarity, etc.) between the entity and all or a portion of the plurality of entities is greater than, is less than, matches, or is within a threshold (e.g., a threshold value, a threshold range, etc.). Based on determining that the correspondence between the entity and a particular entity of the plurality of entities is greater than, matches, or is within a threshold, the computing system may assign a persona previously assigned to the particular entity to the entity.

In some cases, the computing system may route a persona identifier indicative of the persona to one or more computing devices of the plurality of computing devices. The computing system may route a persona identifier associated with a computing device and an output based on image data obtained from the computing device (e.g., the persona identifier overlaid on an image) to the one or more computing devices. In some cases, the computing system may route the persona identifier to a media management system for transmission to one or more computing devices of the plurality of computing devices. For example, the computing system may provide an output to the media management system and the media management system may route the output to one or more of the plurality of computing devices. In some cases, the computing system may obtain data from and route outputs to a first subset of the plurality of computing devices (e.g., located at a particular location) and the media management system may obtain data from and route outputs to a second subset of the plurality of computing devices (e.g., not located at the particular location).

The computing system may identify persona parameters associated with the persona and adjust an output to be provided to the computing device associated with the persona or based on data obtained from a computing device associated with the persona. For example, the computing system may receive data associated with a first computing device and to be routed to a second computing device. Prior to routing the data to the second computing device, the computing device may adjust the data based on persona parameters of a persona associated with the second computing device (e.g., a persona assigned to an entity utilizing the second computing device) and/or persona parameters of a persona associated with the first computing device. The computing device may route the adjusted data to the second computing device.

Embodiments of the present disclosure further enable the computing system to obtain sensor data and process the sensor data based on device parameters. The computing system may obtain sensor data from the plurality of computing devices. In some cases, the computing system may obtain the sensor data from sensors that are separate from the plurality of computing devices. For example, the computing system may obtain audio data from a plurality of microphones that are separate from the plurality of computing devices.

Based on obtaining the sensor data, the computing system may determine device parameters of the plurality of computing devices, the plurality of sensors, etc. utilized to capture the sensor data. For example, the computing system may determine that a first computing device and a second computing device were utilized to capture the sensor data and may identify device parameters associated with the first computing device and the second computing device.

The computing system may process the sensor data based on the device parameters. For example, based on the device parameters indicating that the plurality of computing devices, the plurality of sensors, etc. (or a subset thereof) utilized to capture the sensor data (or a subset of the sensor data) are located at the same location, the computing system may synchronize the sensor data (or the subset of the sensor data) to obtain synchronized data to provide to another computing device such that sensor data associated with the same location does not improperly overlap, cause an echo, or result in other issues. In another example, based on the device parameters indicating that a subset of the computing devices utilized to capture the sensor data are located at the same location, the computing system may synchronize a subset of the sensor data associated with the subset of the computing devices to obtain synchronized data. In some cases, the computing system may process the sensor data by performing echo cancellation, noise suppression, etc. The computing system may route the processed sensor data and an entity identifier of an entity associated with the processed sensor data for output. For example, the computing system may route the processed sensor data and the entity identifier to a media management system for transmission to a computing device.

In some cases, the computing system may obtain, from the media management system, sensor data associated with a particular computing device. For example, the computing device may route sensor data to the media management system and the media management system may route the sensor data (or an output based on the sensor data) to the computing system. The computing system may process the sensor data based on device parameters associated with the particular computing device. Based on obtaining the sensor data from the media management system, the computing system may route the sensor data to one or more computing devices and/or output devices associated with one or more of the same device parameters (e.g., computing devices, speakers, etc. located at a particular location). The computing system may synchronize the one or more computing devices and/or output devices such that all or a portion of the one or more computing devices and/or output devices provide an output (e.g., an audio output, an image output, etc.) in a synchronous manner. In some cases, the computing system may synchronize the one or more computing devices and/or output devices such that each of the one or more computing devices and/or output devices provide the same output, while computing devices and/or output devices that are not associated with the same device parameters may provide a different output (e.g., an unsynchronized output).

The computing system may perform active speaker identification to identify an entity (and a persona) associated with the sensor data. For example, the computing system may provide the sensor data to a machine learning model that is trained to output an identifier of a particular entity and/or computing device associated with the sensor data. The computing system may provide an indicator of the active speaker to one or more computing devices.

As will be appreciated by one of skill in the art in light of the present disclosure, the embodiments disclosed herein improve the ability of computing systems to enable and/or facilitate a conference (e.g., a conference call) between multiple computing devices. Moreover, the presently disclosed embodiments address technical problems inherent within computing systems; specifically, the difficulties of customizing data transmitted between computing devices as part of a conference. These technical problems are addressed by the various technical solutions described herein, including the use of device parameters and persona parameters. Thus, the present disclosure represents an improvement on existing computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which first computing devices 101, second computing devices 103, one or more output device(s) 120, one or more sensor(s) 122, and a media management system 140 may interact with a computing system 110 via a physical connection or via a network 104. By way of illustration, various example first computing devices 101 and second computing devices 103 are shown in communication with the computing system 110, including a desktop computer, laptop, and a mobile phone. In general, the first computing devices 101 and the second computing devices 103 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

The computing system 110 may provide the first computing devices 101 and the second computing devices 103 with one or more user interfaces, command-line interfaces (CLI), application programing interfaces (API), and/or other programmatic interfaces for providing parameters (e.g., persona parameters). For example, the parameters may be customizable parameters. Although one or more embodiments may be described herein as using a user interface, it should be appreciated that such embodiments may, additionally or alternatively, use any CLIs, APIs, or other programmatic interfaces.

In some cases, all or a portion of the first computing devices 101 may be located at (e.g., hardwired at, affixed to, placed at, etc.) a first location. For example, the first location may be a room (e.g., a conference room) and the first computing devices 101 may be hardwired at a table located in the room. All or a portion of the first computing devices 101 may obtain sensor data associated with the first location and/or may provide an output. In some cases, the second computing devices 103 may be located at (e.g., hardwired at, affixed to, placed at, etc.) at one or more second locations different from the first location. For example, the second computing devices 103 may be portable user computing devices that may have a dynamic location (e.g., the location of the second computing devices 103 may be different over time). All or a portion of the second computing devices 103 may obtain sensor data associated with the one or more second locations and/or may provide an output.

In one example, the first computing devices 101 may be computing devices of in-room entities (e.g., in-room participants) and the second computing devices 103 may be computing devices of remote entities (e.g., remote participants). In some cases, the first computing devices 101 and/or the second computing devices 103 may be dynamic such that the number of the first computing devices 101 and/or the number of the second computing devices 103 may change over time (e.g., based on additional remote entities). For example, the number of first computing devices 101 may change depending on the number of in-room entities for a conference and the number of second computing devices 103 may change depending on the number of remote entities for the conference.

The computing system 110 may obtain data (e.g., location data, role data, position data, function data, assignment data, etc.) from the first computing devices 101 and/or the second computing devices 103 and determine a location, a role, a position, a function, an assignment, etc. of all or a portion of the computing devices.

In some cases, the computing system 110 may identify one or more first locations as associated with a conference (e.g., main location of the conference, central location of the conference, origin of the conference, in person location of the conference, in-room location, etc.) and one or more second locations associated with the conference (e.g., remote locations). For example, the computing system 110 may identify the one or more first locations based on a user input, parsing a conference agenda, a number of computing devices connecting to the conference via the one or more first locations as opposed to one or more second locations, etc. In another example, the computing system 110 may determine that more computing devices are connecting to the conference via a first location as compared to computing devices connecting to the conference via one or more second locations and the computing system 110 may identify the first location as an in-room location. Based on identifying the one or more first locations, the computing system 110 may classify one or more computing devices as first computing devices 101 (computing devices joining via the one or more first locations) or second computing devices 103 (computing devices joining via one or more second locations).

The media management system 140 may be any computing system for implementing a communications platform to enable connections between computing devices. For example, the media management system 140 may implement a Zoom platform, a Google Meet platform, a GoTo Meeting platform, etc.

The first computing devices 101, the second computing devices 103, the media management system 140, and the computing system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The one or more output device(s) 120 may include audio output devices (e.g., speakers), image output devices (e.g., displays), etc. The one or more sensor(s) 122 may include audio data sensors (e.g., microphones), image data sensors (e.g., cameras), etc. The one or more output device(s) 120 and one or more sensor(s) 122 may be located at a first location. For example, the one or more output device(s) 120 and one or more sensor(s) 122 may be located at a same location as the first computing devices 101.

In some cases, the one or more output device(s) 120 and one or more sensor(s) 122 may be located at (e.g., hardwired at, affixed to, placed at, etc.) a particular location (e.g., a first location) to obtain sensor data associated with the particular location. For example, the location may be a room (e.g., a conference room) and the one or more output device(s) 120 and one or more sensor(s) 122 may be affixed to a wall of the room, a ceiling of the room, a table located in the room, etc.

In some cases, the one or more output device(s) 120 and/or the one or more sensor(s) 122 may be part of the first computing devices 101. For example, the one or more output device(s) 120 and/or the one or more sensor(s) 122 may be hardware components of the first computing devices 101.

In FIG. 1, the first computing devices 101, the second computing devices 103, and/or the one or more sensor(s) 122 may provide sensor data (e.g., image data, audio data, etc.) to the computing system 110. The first computing devices 101, the second computing devices 103, and/or the output device(s) 120 may obtain sensor data from the computing system 110. In some cases, the second computing devices 103 may provide sensor data to the media management system 140 and the media management system may provide the sensor data to the computing system 110, while the first computing devices 101 and the one or more sensor(s) 122 may provide sensor data directly to the computing system 110. For example, the first computing devices 101 and the one or more sensor(s) 122 may provide sensor data directly to the computing system 110 and the computing system 110 may generate an output based on the sensor data and provide the output to the media management system 140 for transmission to the second computing devices 103. In another example, the second computing devices 103 may provide sensor data to the media management system 140 which may route an output based on the sensor data to the computing system 110. The computing system 110 may process the output and provide the processed output to the first computing devices 101 and/or the output device(s) 120.

The sensor data may be indicative of an environment of the first computing devices 101, the second computing devices 103, and/or the one or more sensor(s) 122. For example, the sensor data may indicate one or more entities located within the environment.

In some cases, the sensor data may be indicative of the one or more entities to facilitate a conference between the one or more entities. For example, the sensor data may be captured to enable identification of the one or more entities by one or more other entities during a conference.

To enable processing of the sensor data, the computing system 110 includes a data management system 130. In some cases, the computing system 110 may be separate and/or located remotely from the data management system 130. The data management system 130 includes an audio data store 132, an image data store 134, a parameter data store 136, an entity data store 138, and a data manager 131. The data manager 131 may obtain data from and/or store data in all or a portion of the audio data store 132, the image data store 134, the parameter data store 136, and/or the entity data store 138. The audio data store 132 stores audio data 133, the image data store 134 stores image data 135, the parameter data store 136 stores parameter(s) 137, and the entity data store 138 stores entity data (the entit(ies) 139 and the persona(s) 141).

The audio data 133 may include a portion of the sensor data provided by the first computing devices 101, the second computing devices 103, and/or the one or more sensor(s) 122. For example, the audio data 133 may include audio data generated by one or more audio sensors.

The image data 135 may include a portion of the sensor data provided by the first computing devices 101, the second computing devices 103, and/or the one or more sensor(s) 122. For example, the image data 135 may include image data generated by one or more image sensors. The image data 135 may include one or more image frames. For example, the image data 135 may include a single image frame, a sequence of image frames, a video, etc. In another example, the image data 135 may include one or more image frames overlaid with audio data.

The parameter(s) 137 may include persona parameters and/or device parameters. In some cases, the data management system 130 may identify the parameter(s) 137 based on the first computing devices 101, the second computing devices 103, and/or the one or more sensor(s) 122. For example, the data management system 130 may identify the first computing devices 101, the second computing devices 103, and/or the one or more sensor(s) 122 and may identify parameter(s) 137 linked (e.g., assigned) to the first computing devices 101, the second computing devices 103, the one or more sensor(s) 122, an entity within obtained sensor data, a persona associated with the entity, etc. In another example, the data management system 130 may identify parameter(s) 137 in the parameter data store 136 based on an identifier of the first computing devices 101, the second computing devices 103, the one or more sensor(s) 122, the entity, the persona, etc.

In some cases, the data management system 130 may generate the parameter(s) 137 based on data (e.g., location data) provided by the first computing devices 101, the second computing devices 103, and/or the one or more sensor(s) 122. For example, the data management system 130 may generate the parameter(s) 137 by providing the data to a machine learning model and obtaining an output from the machine learning model indicative of the parameter(s) 137.

In some cases, the data management system 130 may obtain an input (e.g., indicative of the parameter(s) 137) from the first computing devices 101, the second computing devices 103, and/or the one or more sensor(s) 122.

Based on determining the parameter(s) 137, the data management system 130 (or a separate component) may store the parameter(s) 137 in the parameter data store 136. For example, the data manager 131 may store the parameter(s) 137 in the parameter data store 136.

The entit(ies) 139 may include image data associated with particular entities. For example, the entit(ies) 139 may be one or more image frames indicative of one or more entities. In some cases, the entit(ies) 139 may be obtained from a different computing system. For example, the entit(ies) 139 may be obtained from a separate computing system. The entit(ies) 139 may be generated and/or provided as part of an onboarding process, a login process, an account setup process, etc.

The persona(s) 141 may include one or more labels (e.g., tags, tokens, etc.) for all or a portion of the entit(ies) 139. For example, the persona(s) 141 may indicate English language names (e.g., John Doe, Jane Smith, guest, etc.) for all or a portion of the entit(ies) 139.

In some cases, the data manager 131 may identify an entity of the entit(ies) 139 and/or a persona of the persona(s) 141 based on the image data 135 and/or the audio data 133. For example, the data manager 131 may process (e.g., filter, parse, etc.) the image data 135 to identify the entit(ies) 139 within the image data 135. In some cases, the data manager 131 may utilize a machine learning model to identify the entity. For example, the data manager 131 may provide sensor data to a machine learning model trained to output an identifier of an entity associated with the sensor data and obtain an output from the machine learning model.

The data manager 131 may identify persona(s) 141 for all or a portion of the identified entit(ies) 139. In some cases, the data manager 131 may provide all or a portion of the identified entit(ies) 139 to a second computing system (e.g., a user computing device). The second computing system may provide input to the data management system 130 indicative of the persona(s) 141 for one or more of the identified entit(ies) 139. In some case, the data manager 131 may generate persona(s) 141 for all or a portion of the identified entit(ies) 139. For example, the data manager 131 may implement a machine learning model trained to output a persona for an entity. The data manager 131 may identify all or a portion of the persona(s) 141 utilizing the machine learning model.

The data manager 131 may enable one or more entities to login. In some cases, the data manager 131 may obtain an input (e.g., instructions) indicating that the data manager 131 is to initiate a login process (e.g., a sign in process, a sign up process, a conference initialization process, etc.). For example, the data manager 131 may obtain an input based on an interaction (e.g., by an entity) with a component (e.g., the entity may press a button, flip a switch, etc.) and, in response to the interaction, the data manager 131 may obtain an input indicating that the data manager 131 is to initiate the login process.

To initiate the login process, the data manager 131 may obtain sensor data, identify one or more entities within the sensor data, and login the one or more entities by assigning a persona of the persona(s) 141 to the one or more entities using the entit(ies) 139 and the persona(s) 141. For example, to enable entities to login, the data manager 131 may identify a first entity within sensor data and determine that the first entity corresponds to an entity previously identified by the data manager 131 and included within the entit(ies) 139. The data manager 131 may identify the first entity within the sensor data and may compare the first entity to the entit(ies) 139 using image comparison to identify a second entity of the entit(ies) 139 that has a correspondence with the first entity that is greater than, matches, or is within a particular threshold. Based on identifying the second entity of the entit(ies) 139, the data manager 131 may identify a persona of the persona(s) 141 that is assigned to the identified second entity of the entit(ies) 139. The data manager 131 may assign the identified persona to the identified first entity.

In some cases, the data manager 131 can identify one or more entities and assign a persona to all or a portion of the one or more entities as part of a login process. Based on assigning a persona to an entity (as identified within sensor data captured via a computing device), the data manager 131 may cause the computing device to provide an output indicative of the entity. For example, the data manager 131 may identify computing devices that have one or more entities associated with (e.g., located in view of) the computing devices such that sensor data generated by the computing devices is indicative of (e.g., image data includes) the one or more entities. The data manager 131 may obtain the output from the computing devices based on identifying that the computing devices are associated with one or more entities.

In some embodiments, the data manager 131 may dynamically and automatically build an agenda for a conference. The data manager 131 may identify a conference invite (e.g., a meeting invite) and/or conference notes associated with the conference. For example, the conference invite may be a Zoom invitation, an Outlook invitation, etc. The data manager 131 may dynamically build an agenda based on the conference invite and/or the conference notes. For example, the data manager 131 may parse the conference invite and/or the conference notes to identify a conference time, a conference schedule, conference topic(s), conference speaker(s), conference attendee(s), etc. and may build an agenda based on parsing the conference invite and/or the conference notes. In some cases, the data manager 131 may provide the conference invite and/or the conference notes to a machine learning model trained to output an agenda based on an input.

The data manager 131 may cause display of the agenda (e.g., during the conference) via one or more displays (e.g., displays of the first computing devices 101, the second computing devices 103, and/or the one or more output device(s) 120). For example, the data manager 131 may cause display of the agenda via one or more computing devices associated with logged in entities and/or may route the agenda to the one or more computing devices.

In some cases, the data manager 131 may update the conference invite to include the agenda. The data manager 131 may cause the updated conference invite to be routed to the entit(ies) (e.g., the conference attendees). For example, the data manager 131 may route the conference invite via a message to computing devices associated with the entit(ies). In some cases, the data manager 131 may cause output of the conference invite (e.g., via one or more displays).

The data manager 131 may customize the conference invite and/or the agenda for all or a portion of the entit(ies) 139. For example, the data manager 131 may customize the conference invite and/or the agenda by reordering information within the conference invite and/or the agenda (e.g., moving a section), removing information or adding information to the conference invite and/or the agenda, adjusting a style of the conference invite and/or the agenda (e.g., adjusting a text style, adjusting a color pattern, etc.), etc. The data manager 131 may identify the persona parameter(s) 137 associated with a particular persona of the persona(s) 141 and may adjust the conference invite and/or the agenda based on the persona parameter(s) 137 associated with the persona assigned to the entity that is associated with a particular computing device. The data manager 131 may route the customized conference invite and/or the customized agenda to the respective computing device.

As discussed above, the data manager 131 may obtain sensor data (e.g., audio data 133 and/or image data 135). For example, the data manager 131 may obtain sensor data from the first computing devices 101, the second computing devices 103, and/or the sensor(s) 122. In another example, the data manager 131 may obtain sensor data from the audio data store 132 and/or the image data store 134. The data manager 131 may route an output based on sensor data obtained from a source (e.g., one of the first computing devices 101, the second computing devices 103, and/or the sensor(s) 122, the media management system 140, etc.) to a destination (e.g., each of the other first computing devices 101, the second computing devices 103, and the output device(s) 120, the media management system 140, etc.). In some cases, the data manager 131 may obtain routing data indicating a source and/or a destination of the sensor data.

In some cases, the data manager 131 may obtain sensor data from all or a portion of the first computing devices 101, the second computing devices 103, the sensor(s) 122, and/or the media management system 140. The data manager 131 may obtain sensor data associated with a subset of the first computing devices 101, the second computing devices 103, the sensor(s) 122, and/or the media management system 140 and route an output based on the sensor data to a subset of the first computing devices 101, the second computing devices 103, the output device(s) 120, and/or the media management system 140.

Prior to routing the sensor data from the source to a destination, the data manager 131 may process the sensor data. In some cases, the data manager 131 may process the sensor data and route the processed sensor data (or an output based on the processed sensor data) to a destination.

To process the sensor data (e.g., the audio data 133 and/or the image data 135), the data manager 131 may filter, normalize, transform, adjust, synchronize, encode, etc. the sensor data. For example, the data manager 131 may process the sensor data by performing echo cancellation on the sensor data, suppressing background noise from the sensor data, etc.

The data manager 131 may process the sensor data based on routing data (e.g., indicating the source and/or the destination of the sensor data). For example, the data manager 131 may identify a manner of processing the sensor data based on the routing data (e.g., processing operations according to particular parameters based on the routing data) and may process the sensor data based on the manner of processing the sensor data.

The data manager 131 may identify the parameter(s) 137 associated with the first computing devices 101, the second computing devices 103, the output device(s) 120, and/or the sensor(s) 122 providing the sensor data and/or obtaining the processed sensor data and may process the sensor data based on the parameter(s) 137. For example, the data manager 131 may identify one or more persona parameter(s) 137 based on an identified entity of the entit(ies) 139 and an assigned persona of the persona(s) 141. The one or more persona parameter(s) 137 may indicate timing (e.g., a timing of the output), a manner of image processing (e.g., a brightness, a contrast, an intensity, etc.), a manner of audio processing (e.g., a speed, a pitch, a volume, a language, an intensity, etc.), etc. The persona parameter(s) 137 may be based on information associated with the persona (e.g., a job title, one or more interests, agenda items assigned to the persona, speaking role(s), etc. associated with the persona).

In another example of the parameter(s) 137, the data manager 131 may identify one or more device parameter(s) 137 based on the first computing devices 101, the second computing devices 103, the output device(s) 120, and/or the sensor(s) 122. The one or more device parameter(s) 137 may indicate a location, a role, a position, a function, an assignment, etc. of the first computing devices 101, the second computing devices 103, the output device(s) 120, and/or the sensor(s) 122.

The data manager 131 may process the sensor data based on the parameter(s) 137. For example, the data manager 131 may filter, normalize, transform, adjust, synchronize, encode, etc. the sensor data based on the parameter(s) 137. In some cases, the data manager 131 may process the sensor data based on a first set of parameter(s) 137 associated with the first computing devices 101, the second computing devices 103, the output device(s) 120, and/or the sensor(s) 122 that provided the sensor data and a second set of parameter(s) 137 associated with the first computing devices 101, the second computing devices 103, the output device(s) 120, and/or the sensor(s) 122 obtaining the corresponding output (e.g., the processed sensor data).

To process the sensor data based on device parameter(s) 137, the data manager 131 may identify a first subset of the sensor data associated with a subset of the first computing devices 101, the second computing devices 103, the output device(s) 120, and/or the sensor(s) 122 sharing one or more device parameter(s) 137 (e.g., located at a same location). The data manager 131 may process the first subset of the sensor data using a first set of operations (e.g., synchronizing the first subset of the sensor data based on the subset of the first computing devices 101, the second computing devices 103, the output device(s) 120, and/or the sensor(s) 122 being located at the same location) and a second subset of the sensor data using a second set of operations (e.g., not synchronizing the second subset of the sensor data based on one or more of the first computing devices 101, the second computing devices 103, the output device(s) 120, and/or the sensor(s) 122 being located at different locations). For example, the data manager 131 may process sensor data in a different manner based on the device parameter(s) 137 (e.g., the location) of the first computing devices 101, the second computing devices 103, the output device(s) 120, and/or the sensor(s) 122 associated with the sensor data (e.g., a source of the sensor data, a destination of the sensor data, etc.).

By processing the sensor data based on the device parameter(s) 137, the data manager 131 may process the sensor data according to different manners of processing for different destinations of the sensor data. For example, the data manager 131 may process the sensor data according to a first manner of processing for routing to computing devices located at a first location (e.g., located in-room for the conference) to obtain a first output and may process the sensor data according to a second manner of processing for routing to computing devices located at a second location (e.g., located remotely for the conference) to obtain a second output different from the first output. Therefore, the data manager 131 may route different outputs based on the same sensor data to different destinations based on the device parameter(s) of the destinations.

To process the sensor data based on persona parameter(s) 137, the data manager 131 may identify particular operations to process a subset of the sensor data associated with a subset of the first computing devices 101, the second computing devices 103, the output device(s) 120, and/or the sensor(s) 122 based on a particular persona assigned to an entity associated with the subset of the first computing devices 101, the second computing devices 103, the output device(s) 120, and/or the sensor(s) 122. For example, the data manager 131 may obtain a subset of sensor data from and/or determine an output is to be routed to the subset of the first computing devices 101, the second computing devices 103, the output device(s) 120, the sensor(s) 122, and/or the media management system 140. Based on identifying the entity associated with the subset of the first computing devices 101, the second computing devices 103, the output device(s) 120, the sensor(s) 122, and/or the media management system 140 and a persona assigned to the entity, the data manager 131 can utilize persona parameter(s) 137 associated with the persona to identify particular operations (e.g., adjust the volume, adjust the brightness, increase the intensity, etc.) and adjust the subset of the sensor data using the particular operations.

In some cases, the data manager 131 can process the sensor data and perform active speaker identification. For example, the data manager 131 can process sensor data from multiple computing devices and/or sensors at a same location (e.g., within a conference room) and identify an active speaker. The data manager 131 may utilize one or more machine learning models to perform the active speaker identification. In some cases, the data manager 131 may process the sensor data (e.g., synchronize the sensor data) and may identify the active speaker using the synchronized audio data.

The data manager 131 may route the output to a destination (e.g., the first computing devices 101, the second computing devices 103, the output device(s) 120, the media management system 140, etc.). In some cases, the data manager 131 may instruct the destination to provide the output (e.g., display the output). For example, the data manager 131 may instruct the destination to output audio and/or one or more images based on the processed sensor data.

In some cases, the data manager 131 may route an identifier of the active speaker to the destination. For example, the data manager 131 may route processed sensor data and an identifier of the active speaker associated with all or a portion of the processed sensor data (e.g., John Doe, Jane Smith, etc.). The identifier of the active speaker may include text data (e.g., a name of the active speaker), image data (e.g., an image of the active speaker), etc. In some cases, the identifier of the active speaker may be a persona identifier associated with the persona of the entity identified as the active speaker.

During a conference, the data manager 131 may route sensor data and corresponding outputs between all or a portion of the first computing devices 101, the second computing devices 103, the output device(s) 120, the sensor(s) 122, and/or the media management system 140. As discussed above, the data manager 131 may utilize parameter(s) 137 to process the sensor data and generate the corresponding outputs. The data manager 131 may determine that the conference has ended based on an input (e.g., an input from a user computing device), the conference agenda (e.g., indicating an end time of the conference), the conference schedule, a determination that the data manager 131 has not obtained data from and/or routed data to all or a portion of the first computing devices 101, the second computing devices 103, the output device(s) 120, the sensor(s) 122, and/or the media management system 140 within a particular time period (e.g., a timeout period such as 5 seconds), etc. Based on determining that the conference has ended, the data manager 131 may stop routing sensor data and corresponding outputs between all or a portion of the first computing devices 101, the second computing devices 103, the output device(s) 120, the sensor(s) 122, and/or the media management system 140.

Figure 2:
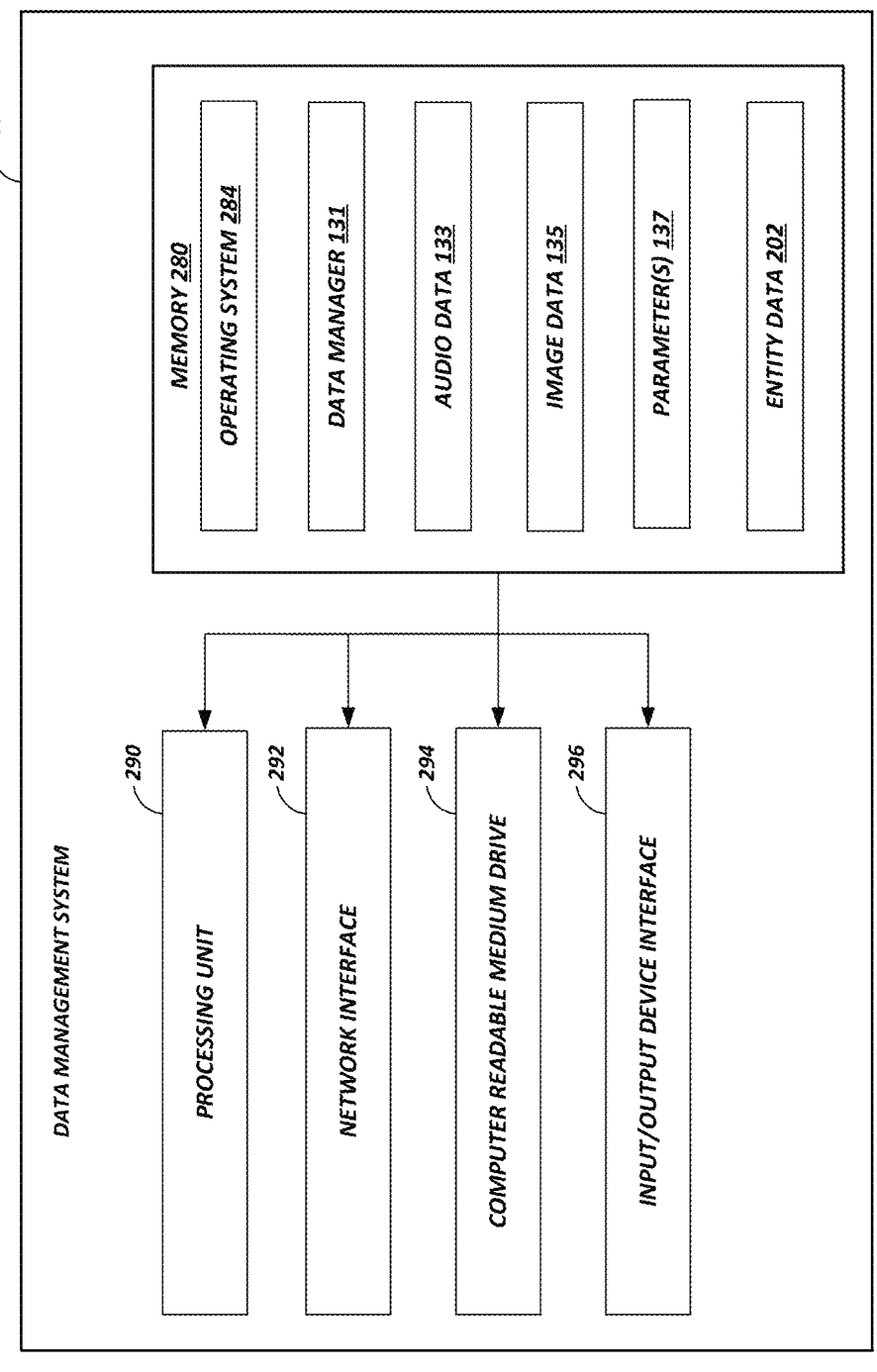
FIG. 2 depicts a general architecture of a computing device or system providing a data management system that can process data obtained from and/or to be routed to computing devices and manage assignment of personas to entities.

FIG. 2 depicts a general architecture of a computing system (referenced as data management system 130) that operates to manage (e.g., route) sensor data associated with a conference. The general architecture of the data management system 130 depicted in FIG. 2 includes an arrangement of computer hardware and software modules that may be used to implement aspects of the present disclosure. For example, aspects of the present disclosure may be implemented by computer hardware modules (e.g., a processor, a processing device, a computing device, etc.) or may be implemented via software modules. In some cases, one or more first aspects of the present disclosure may be implemented by computer hardware modules and one or more second aspects of the present disclosure may be implemented via software modules. The hardware modules may be implemented with physical electronic devices. The data management system 130 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the data management system 130 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the data management system 130, with a higher speed but lower total capacity than a secondary memory, tertiary memory, etc.

The memory 280 may store an operating system 284 that provides computer program instructions for use by the processing unit 290 in the general administration and operation of the data management system 130. The memory 280 may further include computer program instructions and other information for implementing aspects of the present disclosure. For example, in one embodiment, the memory 280 includes a data manager 131 to manage the data as described above. The memory 280 also includes audio data 133, image data 135, parameter(s) 137, and entity data 202 (e.g., personas and entities). The audio data 133, the image data 135, the parameter(s) 137, and/or the entity data 202 may be cached locally to the data management system 130, such as in the form of a memory mapped file. For example, the data management system 130 may obtain the audio data 133, the image data 135, the parameter(s) 137, and/or the entity data 202 and store the audio data 133, the image data 135, the parameter(s) 137, and/or the entity data 202 in memory 280.

The data management system 130 of FIG. 2 is one illustrative configuration of such a device, of which others are possible. For example, while shown as a single device, the data management system 130 may in some embodiments be implemented as a logical device hosted by multiple physical host devices. In other embodiments, the data management system 130 may be implemented as one or more virtual devices executing on a physical computing device. While described in FIG. 2 as the data management system 130, similar components may be utilized in some embodiments to implement other devices shown in the environment 100 of FIG. 1.

As discussed above, the first computing devices 101, the second computing devices 103, the output device(s) 120, and/or the sensor(s) 122 may be implemented to conduct a conference. The first computing devices 101, the output device(s) 120, and/or the sensor(s) 122 may be located at a first location (e.g., in a conference room) associated with the conference (e.g., an origin, a homebase, a central point, etc. of the conference) and the second computing devices 103 may be located at one or more second locations (e.g., may be located remotely from the first location). In some cases, the first location may be the location of the computing system 110.

Figure 3:
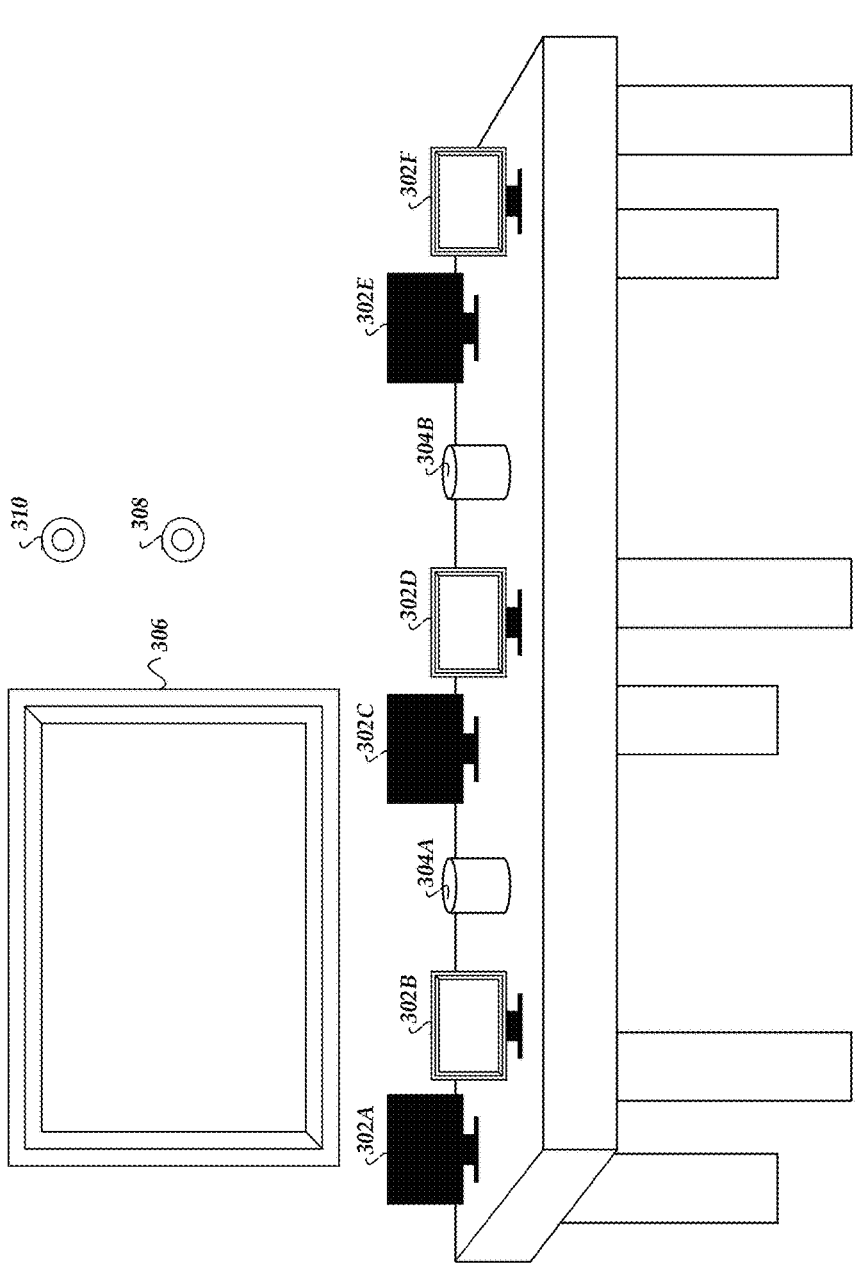
FIG. 3 is a pictorial diagram of an example environment including a plurality of computing devices, sensors, and output devices.

To illustrate how the first computing devices 101, the output device(s) 120, and/or the sensor(s) 122 may be located at the first location, FIG. 3 is a pictorial diagram of an example environment 300 including a plurality of devices to obtain sensor data and provide an output (e.g., to an entity). The plurality of devices may be similar to the first computing devices 101, the output device(s) 120, and/or the sensor(s) 122 as discussed above with reference to FIG. 1. The plurality of devices may be modular such that the devices can be removed, added, or modified in real time on demand.

The plurality of devices located in the environment 300 may include computing devices 302A, 302B, 302C, 302D, 302E, and 302F, computing systems 304A and 304B, output device 306, and sensors 308 and 310. In some cases, all or a portion of the computing devices 302A, 302B, 302C, 302D, 302E, and 302F and/or the computing systems 304A and 304B may include one or more output devices and/or sensors. Further, the output device 306 may include one or more sensors and the sensors 308 and 310 may include one or more output devices.

As discussed above, all or a portion of the computing devices 302A, 302B, 302C, 302D, 302E, and 302F, the computing systems 304A and 304B, the output device 306, and the sensors 308 and 310 may be located within the environment 300. For example, the environment 300 may be a conference room. All or a portion of the computing devices 302A, 302B, 302C, 302D, 302E, and 302F, the computing systems 304A and 304B, the output device 306, and the sensors 308 and 310 may be affixed to the environment 300, affixed to an object (e.g., a wall, a table, a ceiling, etc.) in the environment 300, placed in the environment 300, hardwired within the environment 300, mounted within the environment 300, etc. In some cases, all or a portion of the computing devices 302A, 302B, 302C, 302D, 302E, and 302F, the computing systems 304A and 304B, the output device 306, and the sensors 308 and 310 may be mounted within the environment 300 using one or more hardware mounts, stands, etc.

As discussed above, all or a portion of the computing devices 302A, 302B, 302C, 302D, 302E, and 302F may be user computing devices (e.g., tablets). All or a portion of the computing devices 302A, 302B, 302C, 302D, 302E, and 302F may include one or more sensors (e.g., image sensors, audio sensors, etc.) and/or output devices (e.g., microphones, displays, etc.) to obtain sensor data. The environment 300 may include more, less, or different computing devices.

The output device 306 may provide an output. For example, the output device 306 may include an audio output device (e.g., a microphone) to output audio and/or an image output device (e.g., a display) to output images (e.g., image frames, videos, etc.). The output device 306 may obtain data from one or more of the computing systems 304A and 304B and provide the output. The environment 300 may include more, less, or different output devices.

The sensors 308 and 310 may obtain sensor data. For example, the sensors 308 and 310 may include an audio sensor to obtain audio data and/or an image sensor to obtain image data. The sensors 308 and 310 may route the sensor data to one or more of the computing systems 304A and 304B. The environment 300 may include more, less, or different sensors.

The computing systems 304A and 304B may be similar to and/or may include or may implement the computing system 110 as discussed above with reference to FIG. 1. In some cases, the computing system 304A may be a primary computing system and the computing system 304B may be a backup computing system. In some cases, the computing system 304A and the computing system 304B may perform different functions. For example, the computing system 304A may obtain, process, and route data associated with a first subset of the computing devices 302A, 302B, 302C, 302D, 302E, and 302F, the output device 306, and/or the sensors 308 and 310 and the computing system 304B may obtain, process, and route data associated with a second subset of the computing devices 302A, 302B, 302C, 302D, 302E, and 302F, the output device 306, and/or the sensors 308 and 310. In some cases, the computing system 304A and 304B may share compute resources (e.g., memory) to obtain, process, and route data associated with the computing devices 302A, 302B, 302C, 302D, 302E, and 302F, the output device 306, and/or the sensors 308 and 310. The environment 300 may include more, less, or different computing systems.

All or a portion of the computing devices 302A, 302B, 302C, 302D, 302E, and 302F may obtain an output from and route sensor data to the computing systems 304A and 304B. For example, all or a portion of the computing devices 302A, 302B, 302C, 302D, 302E, and 302F may have a hardwire connection to the computing systems 304A and 304B. In some cases, the hardwire connection between the computing devices 302A, 302B, 302C, 302D, 302E, and 302F and the computing systems 304A and 304B, power connections for the computing devices 302A, 302B, 302C, 302D, 302E, and 302F, and/or network connections for the computing devices 302A, 302B, 302C, 302D, 302E, and 302F may be routed within mounts for the computing devices 302A, 302B, 302C, 302D, 302E, and 302F such that cables for the computing devices 302A, 302B, 302C, 302D, 302E, and 302F are not plainly visible to the human eye. Therefore, all or a portion of the computing devices 302A, 302B, 302C,

302D, 302E, and 302F may route sensor data to the computing systems 304A and 304B.

In some cases, the computing devices 302A, 302B, 302C, 302D, 302E, and 302F may be connected to the computing systems 304A and 304B via a hub (e.g., a universal serial bus ("USB") hub). Further, the computing devices 302A, 302B, 302C, 302D, 302E, and 302F may be connected to a switch (e.g., a network switch).

The computing systems 304A and 304B may obtain sensor data from the computing devices 302A, 302B, 302C, 302D, 302E, and 302F, and/or the sensors 308 and 310 and/or route an output to the computing devices 302A, 302B, 302C, 302D, 302E, and 302F, and/or the output device 306. In some cases, the computing system 304A and 304B may obtain sensor data from one or more sensors of the computing systems 304A and 304B (e.g., one or more audio sensors of the computing systems 304A and 304B). For example, the sensor data may be indicative of audio within the environment 300, an image of the environment 300, audio output by the computing devices 302A, 302B, 302C, 302D, 302E, and 302F, and/or the output device 306, an image displayed via a display of the computing devices 302A, 302B, 302C, 302D, 302E, and 302F, and/or the output device 306 (e.g., screen share data).

The computing systems 304A and 304B may obtain device parameters associated with the computing devices 302A, 302B, 302C, 302D, 302E, and 302F, the output device 306, and/or the sensors 308 and 310. For example, the device parameter(s) may indicate a location, a role, a position, a function, an assignment, etc. of one or more of the computing devices 302A, 302B, 302C, 302D, 302E, and 302F, the output device 306, and/or the sensors 308 and 310. In some cases, the computing systems 304A and 304B may obtain the device parameters based on initiation of a connection (e.g., the hardware connection) between the computing systems 304A and 304B and one or more of the computing devices 302A, 302B, 302C, 302D, 302E, and 302F, the output device 306, and/or the sensors 308 and 310. For example, one or more of the computing systems 304A and 304B may be connected to a device and may obtain device parameters from the device based on the connection. In some cases, one or more of the computing systems 304A and 304B may identify device parameters, within a data store, based on the connection.

The computing devices 302A, 302B, 302C, 302D, 302E, and 302F, the output device 306, and/or the sensors 308 and 310 may have at least one device parameter in common (e.g., may share the at least one device parameter). For example, the computing devices 302A, 302B, 302C, 302D, 302E, and 302F, the output device 306, and/or the sensors 308 and 310 may each have a device parameter indicating that the respective device is located within the environment 300 (e.g., within a conference room).

As discussed above, the computing systems 304A and 304B may process the sensor data obtained from the computing devices 302A, 302B, 302C, 302D, 302E, and 302F, and/or the sensors 308 and 310 and/or the data to be routed to the computing devices 302A, 302B, 302C, 302D, 302E, and 302F, and/or the output device 306. To process the sensor data, the computing systems may filter, normalize, transform, adjust, encode (e.g., using an encoder of the computing systems 304A and 304B), synchronize, etc. the sensor data. For example, the computing systems 304A and 304B may process the sensor data by performing echo cancellation on the sensor data, suppressing background noise from the sensor data, etc.

The computing systems 304A and 304B may process the sensor data obtained from the computing devices 302A, 302B, 302C, 302D, 302E, and 302F, and/or the sensors 308 and 310 and/or the data to be routed to the computing devices 302A, 302B, 302C, 302D, 302E, and 302F, and/or the output device 306 based on the device parameters. The computing systems 304A and 304B may identify data associated with a particular time period and may process the data according to the device parameters. For example, based on the computing devices 302A, 302B, 302C, 302D, 302E, and 302F and/or the sensors 308 and 310 each having a device parameter indicating that the respective device is located within the environment 300, the computing systems 304A and 304B may identify sensor data from all or a portion of the computing devices 302A, 302B, 302C, 302D, 302E, and 302F and/or the sensors 308 and 310. Based on the computing devices 302A, 302B, 302C, 302D, 302E, and 302F and/or the sensors 308 and 310 each having a device parameter indicating that the respective device is located within the environment 300, the computing systems 304A and 304B may synchronize the sensor data from all or a portion of the computing devices 302A, 302B, 302C, 302D, 302E, and 302F and/or the sensors 308 and 310 such that the sensor data is temporally aligned. For example, the computing systems 304A and 304B may synchronize the sensor data such that a first portion of sensor data from computing device 302A, a second portion of sensor data from computing device 302B, and a third portion of sensor data from sensor 308 captured during the same time period are aligned in a temporal manner (e.g., are arranged or layered in a temporally synchronized manner).

In some cases, the computing systems 304A and 304B may process the sensor data by performing noise suppression, echo cancellation, etc. For example, as the computing devices 302A, 302B, 302C, 302D, 302E, and 302F and/or the sensors 308 and 310 are located within the environment 300, sensor data from the computing devices 302A, 302B, 302C, 302D, 302E, and 302F and/or the sensors 308 and 310 may include an echo and/or noise. Therefore, to improve a user experience and based on the device parameters indicating that the computing devices 302A, 302B, 302C, 302D, 302E, and 302F and/or the sensors 308 and 31 are located within the environment 300, the computing systems 304A and 304 may process the sensor data by performing noise suppression, echo cancellation, etc.

Based on processing the sensor data, the computing systems 304A and 304B may generate an output (e.g., processed sensor data). The computing systems 304A and 304B may generate the output and provide the output to a media management system for transmission to one or more devices (e.g., one or more computing devices, one or more sensors, one or more output devices, etc.). In some embodiments, the computing systems 304A and 304B may provide the output directly to one or more devices. The computing systems 304A and 304B may not provide the output to the computing devices 302A, 302B, 302C, 302D, 302E, and 302F and/or the sensors 308 and 310 based on the computing devices 302A, 302B, 302C, 302D, 302E, and 302F and/or the sensors 308 and 310 each having a device parameter indicating that the respective device is located within the environment 300.

The computing systems 304A and 304B may obtain data associated with the one or more devices. For example, the computing systems 304A may obtain the data from the media management system and the data may be based on and/or may include sensor data transmitted by the one or more devices to the media management system. In another example, the computing systems 304A and 304B may obtain the data directly from the one or more devices.

The computing systems 304A and 304B may obtain device parameters associated with the one or more devices (e.g., from the one or more devices, from the media management system, etc.). Based on the device parameters, the computing systems 304A and 304B may determine that at least one of the device parameters of the one or more devices is different from a device parameter of the computing devices 302A, 302B, 302C, 302D, 302E, and 302F and/or the output device 306. For example, the computing systems 304A and 304B may determine that the one or more devices, as compared to the computing devices 302A, 302B, 302C, 302D, 302E, and 302F and/or the output device 306, may have a different location, role, position, function, assignment, etc. based on the device parameters.

Based on determining that at least one of the device parameters of the one or more devices is different from a device parameter of the computing devices 302A, 302B, 302C, 302D, 302E, and 302F and/or the output device 306, the computing systems 304A and 304B may process the data to obtain an output for transmission to the computing devices 302A, 302B, 302C, 302D, 302E, and 302F and/or the output device 306. In some cases, the computing systems 304A and 304B may process the data to obtain an output for transmission to the computing devices 302A, 302B, 302C, 302D, 302E, and 302F and/or the output device 306 based on determining that the data is associated with the one or more devices (e.g., was not generated by the computing devices 302A, 302B, 302C, 302D, 302E, and 302F and/or the output device 306). Therefore, the computing systems 304A and 304B may generate an output for transmission to the computing devices 302A, 302B, 302C, 302D, 302E, and 302F and/or the output device 306.

Based on each of the computing devices 302A, 302B, 302C, 302D, 302E, and 302F and/or the output device 306 having at least one matching device parameter (e.g., indicating that each of the computing devices 302A, 302B, 302C, 302D, 302E, and 302F and/or the output device 306 are located in the environment 300), the computing systems 304A and 304B may determine that the output is to be provided in a synchronous manner by the computing devices 302A, 302B, 302C, 302D, 302E, and 302F and/or the output device 306.

To enable the computing devices 302A, 302B, 302C, 302D, 302E, and 302F and/or the output device 306 to provide the output in a synchronous manner, the computing systems 304A and 304B may provide the output and a timing signal to each of the computing devices 302A, 302B, 302C, 302D, 302E, and 302F and/or the output device 306. The timing signal may indicate when each of the computing devices 302A, 302B, 302C, 302D, 302E, and 302F and/or the output device 306 is to provide the output such that each of the computing devices 302A, 302B, 302C, 302D, 302E, and 302F and/or the output device 306 provides the output in a synchronized manner. In some cases, the computing systems 304A and 304B may determine a customized timing signal for all or a portion of the computing devices 302A, 302B, 302C, 302D, 302E, and 302F and/or the output device 306. For example, the computing systems 304A and 304B may determine the customized timing signals based on the environment 300 (e.g., the audio conditions and/or lighting conditions associated with the environment 300, the placement or position of the computing devices 302A, 302B, 302C, 302D, 302E, and 302F and/or the output device 306 within the environment 300, etc.) such that the timing signals account for the environment 300.

By providing the output and a timing signal to each of the computing devices 302A, 302B, 302C, 302D, 302E, and 302F and/or the output device 306, the computing systems 304A and 304B may synchronize the computing devices 302A, 302B, 302C, 302D, 302E, and 302F and/or the output device 306.

In some cases, the output may be associated with a particular entity. For example, the output may be associated with an out-of-room conference attendee. Further, the output may include an image output (e.g., an output of a single image frame, an output of a video, etc.), an audio output, etc. associated with the out-of-room conference attendee. In some cases, the computing systems 304A and 304B may identify one or more of the computing devices 302A, 302B, 302C, 302D, 302E, and 302F assigned to the out-of-room conference attendee. For example, the computing systems 304A and 304B may assign the one or more of the computing devices 302A, 302B, 302C, 302D, 302E, and 302F to provide an output associated with the out-of-room conference attendee. Based on assigning the one or more of the computing devices 302A, 302B, 302C, 302D, 302E, and 302F to provide the output associated with the out-of-room conference attendee, the computing systems 304A and 304B may route the output to the one or more of the computing devices 302A, 302B, 302C, 302D, 302E, and 302F.

In some cases, the computing systems 304A and 304B may route the output to a first subset of the computing devices 302A, 302B, 302C, 302D, 302E, and 302F associated with the out-of-room conference attendee and may not route the output to a second subset of the computing device 302A, 302B, 302C, 302D, 302E, and 302F not associated with the out-of-room conference attendee.

In some cases, the computing systems 304A and 304B may route the output to all or a portion of the computing devices 302A, 302B, 302C, 302D, 302E, and 302F. The computing systems 304A and 304B may route the output and a manner of displaying the output to all or a portion of the computing devices 302A, 302B, 302C, 302D, 302E, and 302F such that one or more of the computing devices 302A, 302B, 302C, 302D, 302E, and 302F provide the output in an isolated manner and one or more of the computing devices 302A, 302B, 302C, 302D, 302E, and 302F provide the output with output associated with other attendees. For example, the computing systems 304A and 304B may route the output and a first manner of displaying the output (e.g., indicating that the output should be isolated from other output) to a first computing device such that the first computing device provide the output isolated from other output (e.g., such that the first computing device provides image output and audio output associated with the out-of-room conference attendee or from a computing device associated with the out-of-room conference attendee). Further, the computing systems 304A and 304B may route the output and a second manner of displaying the output (e.g., indicating that the output should not be isolated from other output) to a second computing device such that the second computing device provides the output with other output (e.g., such that the second computing device provides image output and audio output associated with multiple attendees or from computing devices associated with the multiple attendees). For example, the first computing device may provide a single panel image output associated with the out-of-room conference attendee and the second computing device may provide a multi-panel image output associated with multiple attendees (e.g., including the out-of-room conference attendee).

Figure 4A:
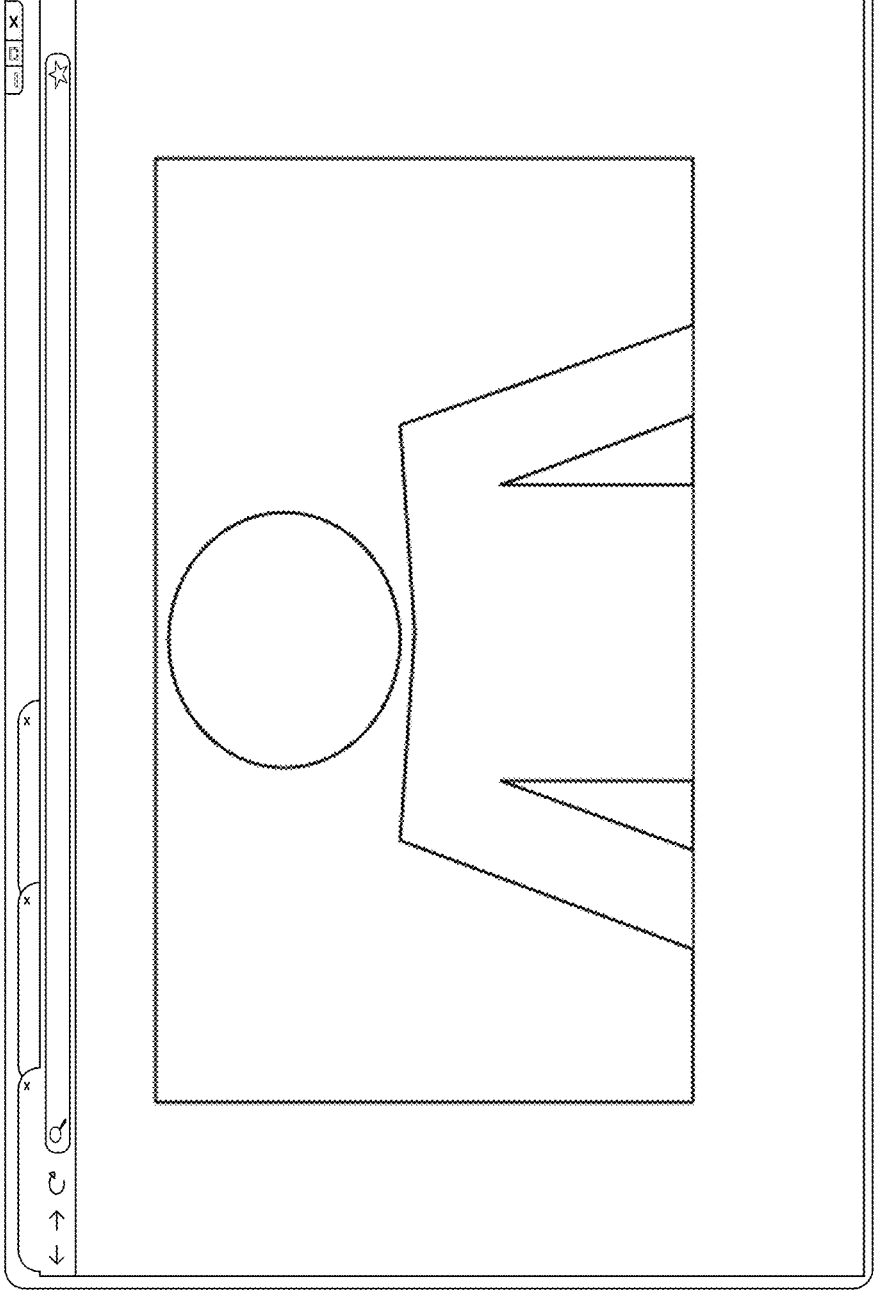
FIG. 4A depicts an example interface indicating an entity within image data.

As discussed above, the computing systems 304A and 304B may process data (e.g., sensor data) based on persona parameters. For example, the computing systems 304A and 304B may process data based on persona parameters and device parameters. To process data based on persona parameters, the computing systems 304A and 304B may identify a persona of an entity and persona parameters associated with the persona. FIG. 4A depicts an example interface 400A indicating an entity within an environment. The interface 400A includes a virtual representation of sensor data. Further, the interface 400A includes a virtual representation of an entity within sensor data.

A computing system (e.g., the media management system 140, the computing system 110, etc.) may instruct display of the virtual representation via a user interface of a computing device (e.g., computing device 302A, computing device 302B, etc.) and/or an output device (e.g., output device 306).

The computing system may instruct display of the virtual representation based on an input. For example, the computing system may instruct display of the virtual representation based on an input indicating initiation of a conference. In some cases, the computing system may automatically instruct display of the virtual representation based on the input.

In some cases, the computing system may instruct display of the virtual representation based on processing the sensor data. For example, the computing system may process the sensor data and determine that an entity is associated with (e.g., is located within, is captured by, etc.) the sensor data (e.g., using image recognition). Based on determining that the entity is associated with the sensor data, the computing system may instruct display of the virtual representation.

Figure 4B:
FIG. 4B depicts an example interface indicating a persona assigned to an entity within image data.
Figure 4B:
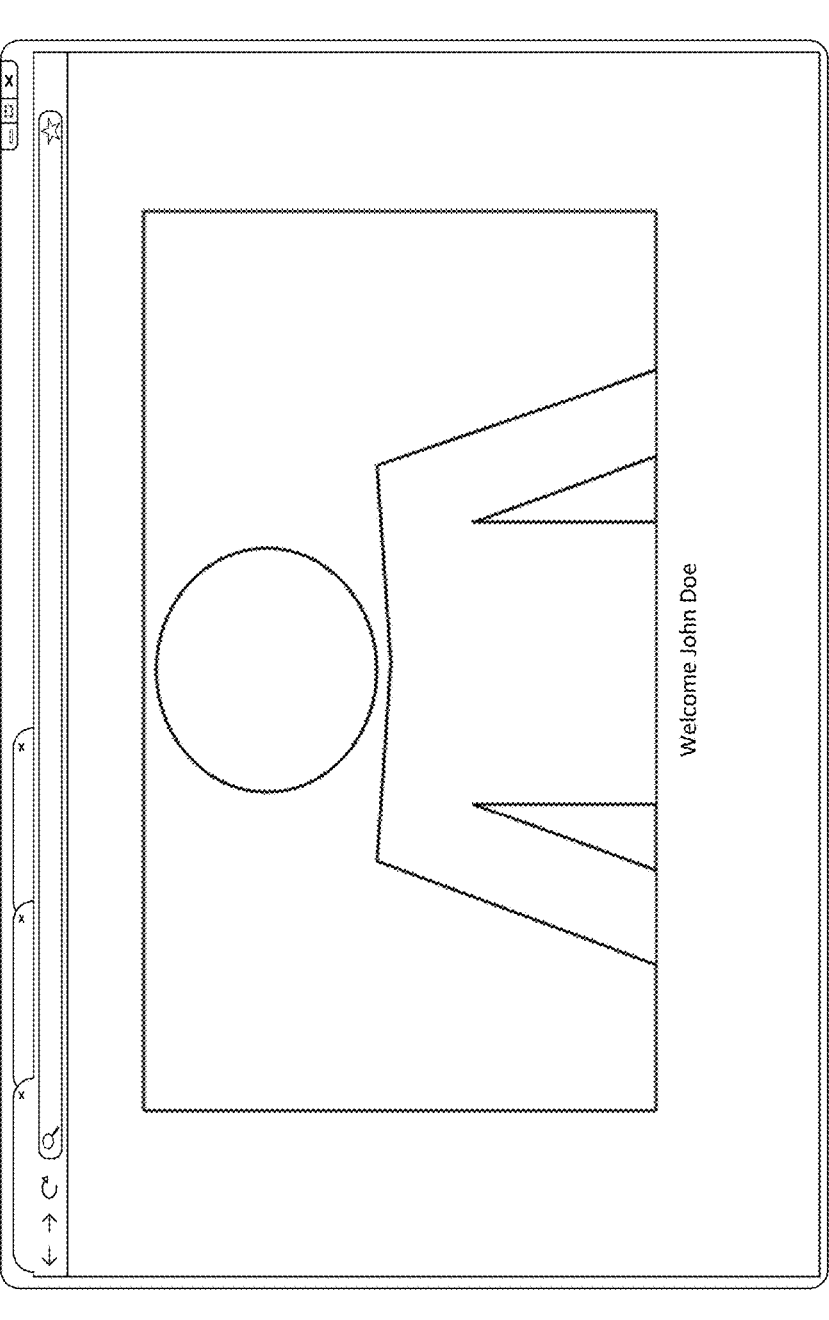

In some cases, the computing system may instruct display of the virtual representation as part of a login process. As part of the login process, the computing system may assign a persona to the entity. To assign a persona to the entity, the computing system may identify the entity, compare the entity to one or more entities indicated by entity data to identify a second entity assigned a particular persona, and assign the particular persona to the entity. Based on assigning a persona to the entity and/or identifying a persona assigned to the entity, the computing system may update the virtual representation. FIG. 4B depicts an example interface 400B indicating an entity within an environment and a persona assigned to the entity. The interface 400B includes a virtual representation of sensor data including an entity within the sensor data. Further, the interface 400B includes a persona identifier associated with the persona. For example, the persona identifier may be an English language textual or audible identifier of the persona. In the example of FIG. 4B, the persona identifier is the textual identifier: "John Doe." The interface 400B further includes additional output (e.g., a message, a prompt, a request, etc.). In the example of FIG. 4B, the additional output is the textual output: "Welcome."

A computing system (e.g., the media management system 140, the computing system 110, etc.) may instruct display of the virtual representation via a user interface of a computing device (e.g., computing device 302A, computing device 302B, etc.) and/or an output device (e.g., output device 306). In some cases, the computing system may instruct display of the virtual representation based on assigning a persona to the entity and/or identifying a persona assigned to the entity.

As discussed above, based on assigning the persona to the entity and/or identifying that the persona is assigned to the entity, the computing system may identify persona parameters associated with the persona. In some cases, the persona parameters may indicate a manner of outputting the persona identifier and/or the additional output. For example, the persona parameters may include a volume, a dialect, a language, a text size, a text font, etc. Therefore, the persona parameters may enable the computing system to customize the interface 400B based on requirements of a particular entity (e.g., the entity is hard of hearing, the entity is near sighted, etc.).

The computing system may customize the interface 400B (e.g., may customize the persona identifier and/or the additional output) based on the persona parameters associated with the persona. For example, the computing system may increase a text size of text displayed via the interface 400B based on the persona parameters as compared to text displayed via an interface based on different persona parameters.

Figure 5:
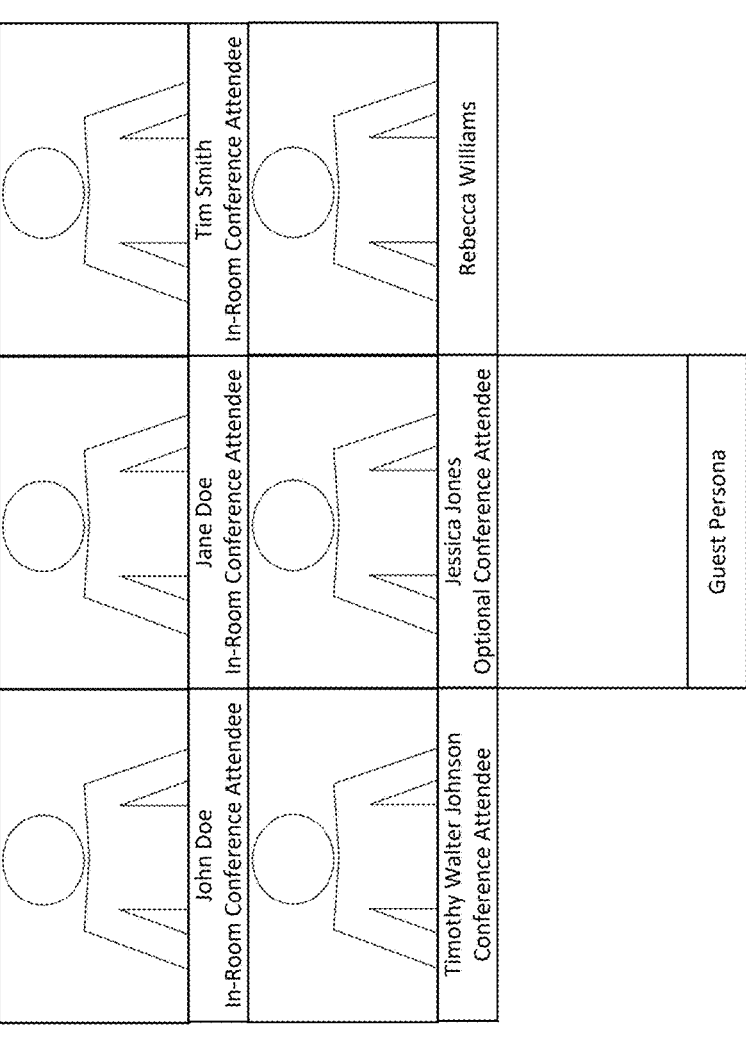
FIG. 5 is a pictorial diagram of example entity data.

As discussed above, to assign a persona to the entity, the computing system may identify the entity and compare the entity to one or more entities indicated by entity data to identify a second entity assigned a particular persona. FIG. 5 is a pictorial diagram of entity data 500. The entity data may include one or more entities and one or more personas. The entity data may include entities linked with a conference (e.g., indicated as attending a conference, conference attendees). The entity data may include information associated with a conference (e.g., a location of the conference). For example, the entity data may include information indicating a conference room in which in-room conference attendees are meeting for the conference.

The entity data may indicate a location (e.g., GPS coordinates, a conference room name, an address, etc.) of the entities. For example, the entity data may indicate whether an entity is an in-room conference attendee or an out-of-room conference attendee (e.g., a remote attendee). In some cases, the entity data may indicate one or more entities associated with a same location. For example, the entity data may indicate that a first subset of entities are attending the conference from a first conference room and a second subset of the entities are attending the conference from a second conference room.

A computing system may determine whether an entity is an in-room conference attendee or an out-of-room conference attendee by comparing a location of the entity to a location of the conference and may update the entity data. In some cases, the computing system may obtain input from user computing devices (e.g., indicating that an entity will attend the conference, indicating that the entity will attend the conference remotely or in-room, etc.), determine whether an entity is an in-room conference attendee or an out-of-room conference attendee based on the input, and update the entity data. For example, the computing system may obtain the input as part of a sign up process and may update the entity data using the input.

In some cases, the entity data may include entities listed as optional conference attendees, entities that are not listed as conference attendees, entities that are listed as not attending the conference, etc. For example, the entity data may include one or more entities and information indicating that the one or more entities are optional conference attendees.

A computing system may populate the entity data from a larger set of entity data (e.g., a company phonebook) based on a conference agenda (e.g., indicating conference attendees, optional conference attendees, etc.). In some cases, the larger set of entity data may include entities listed as in-room conference attendees, entities listed as out-of-room conference attendees, entities listed as optional conference attendees, entities that are not listed as conference attendees, and/or entities that are listed as not attending the conference and the entity data may include entities listed as in-room conference attendees.

The one or more entities may include and/or may be identified using data associated with the one or more entities. For example, the one or more entities may be associated with sensor data indicative of the entities. In another example, the data may include image data where the one or more entities are included within the image data and/or audio data where the one or more entities produce at least a portion of the audio data (e.g., at least a portion of the audio data includes the one or more entities speaking). To compare an entity with the one or more entities, the computing system may compare data (e.g., image data and/or audio data) associated with the entity to the data associated with the one or more entities (e.g., verified data, data previously linked to the one or more entities, etc.).

The one or more personas may be identified using persona identifiers. For example, the persona identifiers may include text data, image data, audio data, etc. associated with the one or more personas. In another example, the persona identifiers may include a name, an address, a location, etc. of a particular associated entity. Further, the persona identifiers may identify whether a particular associated entity is listed as a conference attendee.

In the example of FIG. 5, a first entity is associated with first image data and a first persona identifier indicating: "John Doe In-Room Conference Attendee," a second entity is associated with second image data and a second persona identifier indicating: "Jane Doe In-Room Conference Attendee," a third entity is associated with third image data and a third persona identifier indicating: "Tim Smith In-Room Conference Attendee," a fourth entity is associated with fourth image data and a fourth persona identifier indicating: "Timothy Walter Johnson Conference Attendee," a fifth entity is associated with fifth image data and a fifth persona identifier indicating: "Jessica Jones Optional Conference Attendee," a sixth entity is associated with sixth image data and a sixth persona identifier indicating "Rebecca Williams," and a seventh guest entity is associated with a seventh persona identifier indicating: "Guest Persona."

The computing system may compare an entity with the one or more entities to identify whether the entity corresponds to an in-room conference attendee. If the computing system determines that the entity does not correspond to a previously listed in-room conference attendee, the computing system may assign the entity a guest persona and/or request that the entity provide a persona identifier for the entity (e.g., via a user interface). In some cases, if the computing system determines that the entity does not correspond to a previously listed in-room conference attendee, the computing system may compare the entity to one or more entities listed as out-of-room conference attendees, one or more entities listed as conference attendees (e.g., without location information), one or more entities listed as optional conference attendees, one or more entities listed as not attending the conference, one or more attendees not listed as attending the conference (e.g., without attendee information), etc.. (e.g., from the larger set of entity data). In some cases, if the computing system determines that the entity does not correspond to a previously listed in-room conference attendee or a previously listed out-of-room conference attendee, the computing system may compare the entity to one or more entities listed as optional conference attendees, not listed as attending the conference, or listed as not attending the conference (e.g., from the larger set of entity data). If the computing system determines that the entity does not correspond to a previously listed in-room conference attendee, out-of-room conference attendee, general conference attendee (e.g., neither listed as an in-room conference attendee or an out-of-room conference attendee), an optional conference attendee, or a non-attendee of the conference (e.g., an entity not listed as attending the conference or an entity listed as not attending the conference) from the larger set of entity data, the computing system may assign the entity a guest persona.

Figure 6:
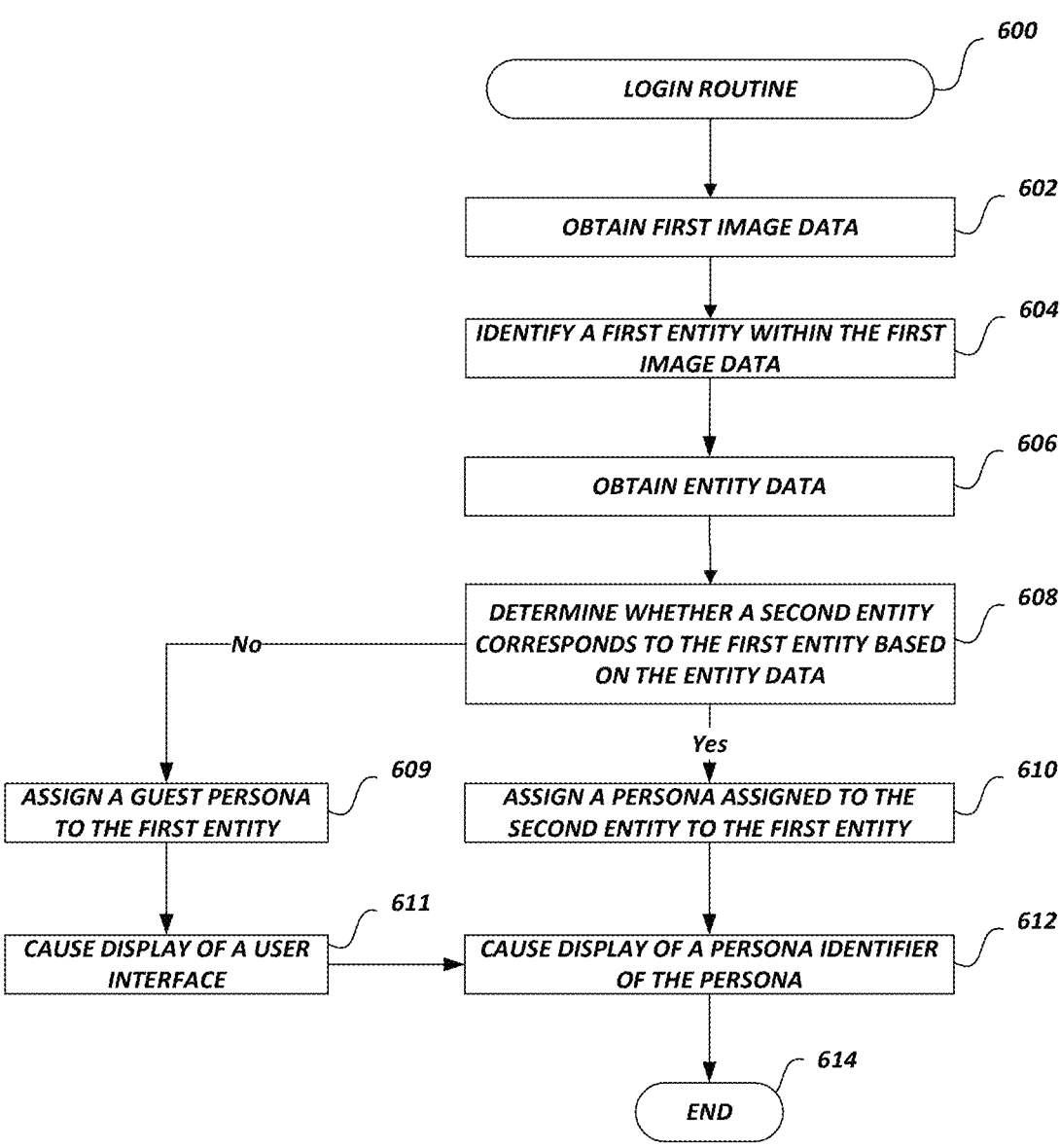
FIG. 6 depicts an illustrative routine for a sign on process including assigning a persona to an entity and processing data based on persona parameters associated with the persona.

As discussed above, based on the persona assigned to an entity, a computing system may identify persona parameters associated with the persona. In some cases, a guest persona may be assigned guest persona parameters (e.g., default persona parameters). The computing system may process data routed by and/or to be routed to a computing device based on the persona parameters. With reference to FIG. 6, an illustrative routine 600 will be described for a login process that includes assigning a persona to an entity and processing data based on persona parameters associated with the persona. The routine 600 may be implemented for example, by the computing system 110 of FIG. 1 (e.g., which may include a computing device). In some cases, the routine 600 may be implemented by a processor. The routine 600 begins at block 602, where the computing system obtains first image data. For example, the computing system may obtain first image data associated with (e.g., from) a device (e.g., a first computing device, a first sensor, etc.).

In some cases, prior to obtaining the first image data, the computing system may determine initiation of a first connection between the computing system (or a component of the computing system) and the device. The computing system may determine initiation of a first connection based on obtaining data (e.g., initial image data, initial audio data, initial input, etc.) from the device. For example, the data may be based on a movement or click via an input device, a button press, movement within image data, etc. In some cases, the computing system may determine initiation of the first connection based on obtaining particular data (e.g., indicating movement of an entity within one or more image frames and/or indicating an entity is speaking). The computing system may obtain the first image data based on the first connection (e.g., via the first connection, based on determining initiation of the first connection, etc.). The first connection may be a hardwired connection or a wireless connection (e.g., a wireless connection via a network).

Based on obtaining the first image data, at block 604, the computing system identifies a first entity (e.g., a first figure) within the first image data. For example, the first image data may include a first image frame indicative of the first entity. The computing system may analyze the first image data to identify the first entity within the first image data. For example, the computing system may provide the first image data and/or audio data to a machine learning model trained to provide an output indicative of an entity. The computing system may obtain an output from the machine learning model and may identify the entity based on the output.

In some cases, the computing system may identify multiple entities within the first image data. For example, the computing system may identify a first entity, a second entity, a third entity, etc. within the first image data. In some cases, the computing system may obtain image data from multiple devices (e.g., based on determining initiation of a connection between the computing system and each of the devices). The computing system may identify a first entity within first image data obtained from a first device (e.g., a first computing device), a second entity within second image data obtained from a second device (e.g., a second computing device), etc.

In order to determine how to process data associated with the first entity, at block 606, the computing system obtains entity data. The computing system may obtain the entity data from a data store. The entity data may indicate one or more entities (e.g., one or more figures) and, for all or a portion of the one or more entities, a respective persona, of one or more personas, assigned to the entity. In some cases, the entity data may include image data indicative of the one or more entities and one or more labels associated with (e.g., indicative of) the one or more personas. For example, the image data may include multiple image frames that are each indicative of a particular entity of the one or more entities. In some cases, a label may be located within the image data identifying a persona of an entity located within the image data.

In some cases, the computing system may obtain an input defining the entity data. For example, the input may define the entity data as including a subset of a plurality of entities (e.g., the subset of the plurality of entities corresponding to the one or more entities). The computing system may generate the entity data based on the input (e.g., by filtering the plurality of entities as identified by a larger set of entity data) and store the generated entity data in the data store.

In some cases, the computing system may generate the entity data by assigning image data to one or more personas or persona identifiers. For example, the computing system may obtain image data indicative of or including one or more entities. The computing system may request persona identifiers for all or a portion of the one or more entities. For example, the computing system may request persona identifiers for all or a portion of the one or more entities from a user computing device and may obtain the persona identifiers from the user computing device. The computing system may generate the entity data based on the image data and the persona identifiers.

To determine an entity corresponding to the first entity, at block 608, the computing system determines (e.g., identifies) whether a second entity corresponds to the first entity based on the entity data. In some cases, the computing system may compare the first entity to the one or more entities identified by the entity data to determine the second entity and may identify the second entity based on comparing the first entity to the one or more entities. For example, the computing system may determine a correspondence (e.g., similarity) between the first entity and all or a portion of the one or more entities.

The computing system may determine whether the correspondence, for all or a portion of the one or more entities, is greater than, is less than, matches, or is within a threshold (e.g., a threshold value, a threshold range, etc.). The computing system may determine the second entity based on determining whether the correspondence, for all or a portion of the one or more entities, is greater than, is less than, matches, or is within a threshold (e.g., based on determining the correspondence between the first entity and the second entity is greater than or matches the threshold). For example, the computing may determine that a first correspondence between the first entity and a third entity of the one or more entities is less than a threshold and a second correspondence between the first entity and the second entity is greater than or matches the threshold and may identify the second entity based on the first correspondence and the second correspondence.

In some cases, the computing system may compare image data indicative of the first entity (e.g., a subset of the first image data) to image data indicative of the one or more entities to determine the second entity. For example, the computing system may perform image comparison using the image data indicative of the first entity and the image data indicative of the one or more entities. In another example, the computing system may compare an image frame of the first image data to one or more image frames of the image data indicative of the one or more entities to identify the second entity.

In some cases, the computing system may compare the first entity to the one or more entities (or compare corresponding image data) and may determine that a correspondence between the first entity and each of the one or more entities is less than or equal to a threshold. In some cases, in response to determining that the correspondence between the first entity and each of the one or more entities is less than or equal to the threshold, the computing system may compare the first entity to one or more second entities. For example, the one or more entities may correspond to a first subset of a plurality of entities (e.g., entities listed as in-room conference attendees) and the one or more second entities may correspond to a second subset of a plurality of entities (e.g., entities listed as out-of-room conference attendees, general conference attendees, an optional conference attendees, or non-attendees of the conference). In some cases, the computing system may determine the second entity based on comparing the entity to the one or more second entities. For example, the one or more second entities may include the second entity.

In some cases, the computing system may identify multiple entities based on the entity data. For example, the computing system may determine and assign one or more second entities of the entity data to the first entity within the first image data, one or more fourth entities of the entity data to a third entity within the first image data, one or more sixth entities of the entity data to a fifth entity within second image data, etc.

In some cases, in response to determining that the correspondence between the first entity and each of the one or more entities does not satisfy (e.g., is less than or equal to) the threshold and/or that the correspondence between the first entity and each of the one or more second entities does not satisfy the threshold, the computing system may determine that a second entity (of the one or more entities) does not correspond to the first entity based on the entity data. Based on determining that a second entity does not correspond to the first entity based on the entity data, the routine 600 may proceed to block 609. At block 609, the computing system may assign a guest persona to the first entity. For example, the guest persona may be a generic persona, a placeholder persona, a default persona, etc.

Further, in response to determining that the correspondence between the first entity and each of the one or more entities is less than or equal to the threshold and/or that the correspondence between the first entity and each of the one or more second entities is less than or equal to the threshold, at block 611, the computing system may cause display, via the device, of a user interface. Via the user interface, the computing system may request a persona for the first entity from an entity. For example, the user interface may include a request for the entity to provide a persona (or a persona identifier) (e.g., via a sign-on screen). The computing system may obtain an input, via the user interface, from the device. The input may identify the persona (or the persona identifier). The computing system may assign the identified persona to the first entity. In some cases, the computing system may update the entity data based on assigning the identified persona to the first entity. In some cases, the computing system may assign the guest persona to the first entity and may not request a persona and/or may not obtain input from an entity identifying a persona. Further, the computing system may update the entity data based on assigning the guest persona to the first entity. The routine 600 may proceed to block 612.

Returning to block 608, in response to determining that the correspondence between the first entity and each of the one or more entities satisfies (e.g., is greater than or equal to) the threshold and/or that the correspondence between the first entity and each of the one or more second entities satisfies the threshold, the computing system may determine that a second entity (of the one or more entities) does correspond to the first entity based on the entity data. Based on determining that a second entity does correspond to the first entity, the routine 600 may proceed to block 610. At block 610, the computing system may assign a persona assigned to the second entity to the first entity. The computing system may determine that the persona (e.g., a first persona) is assigned to the second entity (e.g., based on the entity data) and may assign the persona to the first entity based on determining that the persona is assigned to the second entity.

In some cases, the computing system may assign one or more personas to multiple entities within the image data. For example, the computing system may determine and assign a first persona to the first entity within the first image data, a second persona to a third entity within the first image data, etc.

In some cases, the computing system may update the entity data based on assigning the persona to the first entity. For example, the computing system may link the first entity to the persona within the entity data.

In some embodiments, the computing system may obtain image data from multiple devices (e.g., multiple computing devices). The computing system may identify one or more entities within the image data obtained from each device and may determine a respective entity of the one or more entities of the entity data for each of the one or more entities within the image data for each device. The computing system may determine a respective persona for each respective entity and may assign the respective persona to each of the one or more entities within the image data for each device.

The persona may be associated with one or more persona parameters (e.g., indicative of a timing, a brightness, a contrast, a speed, a pitch, a volume, a language, an intensity, etc. associated with a persona of an entity associated with the data) which may indicate a particular parameter and a particular parameter value (e.g., brightness: 20 lumens, volume: 80 decibels, etc.). The one or more persona parameters may indicate how to process data obtained from and/or to be routed to a device associated with the persona. The computing system may identify the one or more persona parameters based on the persona.

In some cases, the computing system may provide the one or more persona parameters (including the associated parameter values) to the device. The computing system may automatically adjust one or more parameters of the device according to the one or more persona parameters (and the associated parameter values) to adjust how the device provides an output to an entity and/or provides sensor data to the computing system. For example, the computing system may automatically adjust a brightness of the device based on the one or more persona parameters.

In some cases, the computing system may adjust parameters of the computing system according to the one or more persona parameters to adjust how the computing system generates an output and/or processes sensor data associated with the device.

Based on the assignment of a persona (e.g., the persona, the guest persona, etc.) to the first entity, at block 612, the computing system causes display of a persona identifier of the persona. For example, the computing system may cause display of a persona identifier and/or the first image data via the device or another device. In some cases, the computing system may cause display of the persona identifier and an output based on additional image data obtained from the device. For example, the computing system may generate the additional image data based on one or more persona identifiers associated with personas assigned to entities within the first image data and the first image data (e.g., the additional image data may include one or more persona identifiers overlaid in textual format on the first image data). In some cases, the additional image data may include second image data obtained from the device.

The computing system may identify the persona identifier (e.g., a first persona identifier) associated with the persona based on the data linking the persona identifier to the persona. In some cases, the computing system may generate the persona identifier for the persona.

In some cases, the computing system may route the persona identifier and an output based on the first image data, and/or the additional image data to a media management system. For example, the computing system may route the persona identifier to the media management system for transmission to a second device based on the assignment of the persona to the first entity and based on a second connection between the media management system and the second device.

The computing system may obtain sensor data (e.g., audio data, second image data, etc.) associated with the second device. For example, the computing system may obtain second image data from the media management system based on transmission of the second image data or corresponding data by the second device to the media management system. In another example, the computing system may obtain the second image data from the second device. The computing system may dynamically adjust the sensor data based on the persona assigned to the first entity and the one or more persona parameters associated with the persona to obtain first dynamically adjusted sensor data. For example, the computing system may dynamically adjust a timing, a brightness, a contrast, a speed, a pitch, a volume, a language, an intensity, etc. of the sensor data and cause the device to provide an output (e.g., display) based on the dynamically adjusted sensor data. The computing system may route the output to the device. The routine 600 then ends at block 614.

In various embodiments, the routine 600 may include more, fewer, different, or different combinations of blocks than those depicted in FIG. 6. For example, the routine 600 may, in some embodiments, include updating of the entity data. As a further example, blocks 606 and 608 may be omitted and the computing system may assign a persona to the first entity without identifying the second entity. As a further example, blocks 606 and 608 may be combined, and the routine 600 may identify the second entity without separately obtaining entity data. In some cases, the routine 600 may be repeated for multiple devices, additional image data, etc. The routine 600 depicted in FIG. 6 is thus understood to be illustrative and not limiting.

Figure 7:
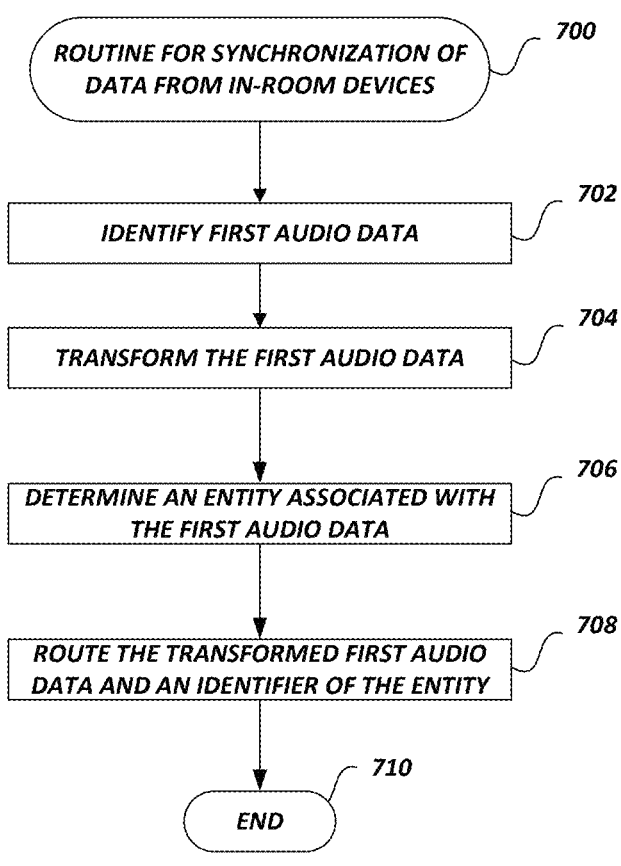
FIG. 7 depicts an illustrative routine for determining device parameters of devices and processing data obtained from the devices according to the device parameters.

As discussed above, the computing system may process data routed to and/or obtained from a device based on device parameters associated with the device. With reference to FIG. 7, an illustrative routine 700 will be described for determining the device parameters and processing (e.g., synchronizing) data according to the device parameters indicating that a device providing the data is an in-room device. The routine 700 may be implemented for example, by the computing system 110 of FIG. 1. In some cases, the routine 700 may be implemented by a processor. The routine 700 begins at block 702, where the computing system identifies first audio data. To identify the first audio data, the computing system may obtain the first audio data from one or more first devices (e.g., one or more first computing devices, one or more first sensors, etc.) of a plurality of devices (e.g., a plurality of computing devices, sensors, etc.). For example, the computing system may obtain the first audio data from a plurality of microphones (e.g., a plurality of first microphones). In a further example, the computing system may obtain respective first audio data from each of the plurality of microphones. The one or more first devices may be in-room devices of the plurality of devices. In some cases, the computing system may obtain sensor data (e.g., image data, the first audio data, etc.) from the one or more first devices.

All or a portion of the one or more first devices may correspond to (e.g., may be assigned) one or more respective parameters (e.g., a respective first set of device parameters). For example, the parameters may be device parameters (e.g., indicative of a location, a role, a position, a function, an assignment, etc. of a device providing and/or obtaining the data). The computing system may identify the device parameters of all or a portion of the one or more first devices based on input received from the one or more first devices (e.g., messages), sensor data associated with the one or more first devices (e.g., location data), and/or data stored by the computing system.

Based on device parameters of the one or more first devices, at block 704, the computing system transforms the first audio data. In some cases, the computing system may transform sensor data that may include the first audio data, image data, etc. The computing system may transform (e.g., synchronize, filter, etc.) the first audio data based on the one or more first devices that provided the first audio data to the computing system having one or more same device parameters (e.g., indicating that the one or more first devices are located at the same location). For example, the one or more first devices may have one or more same device parameters indicating that the one or more first devices are located at the same location (e.g., the location of the one or more first devices corresponds to a first location). In another example, the one or more first devices may have one or more same device parameters indicating that the one or more first devices are in-room devices. In some cases, the one or more first devices and the computing system may be located at the same location (e.g., within a particular environment).

The computing system may transform the first audio data using a machine learning model. For example, the computing system may provide the first audio data to the machine learning model trained to output transformed first audio data and may obtain the transformed first audio data from the machine learning model.

To transform the first audio data, the computing system may synchronize the first audio data, perform echo cancellation on the first audio data, perform noise suppression, filter the first audio data, etc. The computing system may synchronize the first audio data such that audio data from multiple devices is synchronized into synchronized first audio data that includes the audio data from a device of the multiple devices overlaid on audio data from other devices of the multiple devices based on the timing of the generation or obtaining of the audio data. For example, the computing system may synchronize respective first audio data from each of a plurality of microphones. In another example, the computing system may synchronize a first portion of the first audio data (e.g., from a first device) to a second portion of the first audio data (e.g., from a second device). In some cases, the computing system may determine that a first device is located closest to an active speaker as compared to other devices of the one or more first devices and may filter out or reduce a volume of audio data received from other devices when the active speaker is speaking (e.g., to high-light or focus on the audio data of the first device).

Based on synchronizing the first audio data, the comput-ing system may obtain synchronized first audio data. The synchronized first audio data may include audio data from multiple devices that is synchronized (e.g., aligned) by the computing system.

In order to identify an active speaker, at block 706, the computing system determines an entity associated with the first audio data. The computing system may determine the entity from a plurality of entities. In some cases, the com-puting system may determine an entity associated with the transformed (e.g., synchronized) first audio data.

To determine the entity (e.g., an active speaker entity), the computing system may identify sensor data (e.g., image data, audio data, etc.) associated with the one or more first devices. For example, the computing system may identify image data (e.g., the computing system may obtain the image data from the one or more first devices) and/or the first audio data. The computing system may analyze the image data and/or the first audio data and identify an entity based on analyzing the image data and/or the first audio data. For example, the computing system may provide the image data and/or the first audio data to a machine learning model trained to provide an output indicative of an entity, may obtain an output from the machine learning model, and may identify the entity based on the output. In some cases, the computing system may identify a plurality of entities based on the image data. For example, the computing system may analyze the image data to identify one or more entities (e.g., the plurality of entities) within the image data and may analyze the audio data to identify audio associated with one or more entities (e.g., speech of the entities).

The computing system may identify a plurality of entities. For example, the computing system may identify an entity for all or a portion of the one or more first devices. For example, the computing system may identify a first entity is within first image data from a first computing device, a second entity is within second image data from a second computing device, a third entity is within third image data from an image sensor, and audio associated with a fourth entity is within first audio data from an audio sensor.

The computing system may identify a location for all or a portion of the plurality of entities. For example, the computing system may identify a location for a respective entity as corresponding to a location of the one or more first devices providing sensor data in which the respective entity is identified. The computing system may determine the entity based on identifying the location for all or a portion of the plurality of entities.

In some cases, the computing system may obtain an identifier of the entity (e.g., an entity identifier) that is indicative of the entity based on analyzing the image data and/or the first audio data. For example, the identifier of the entity may be a persona, a persona identifier, etc.

The computing system may link sensor data (e.g., trans-formed sensor data, the first audio data, the transformed first audio data, etc.) to the entity. For example, the computing system may link the sensor data to the entity and update entity data based on linking the sensor data to the entity.

In some cases, the computing system may generate trans-formed image data. For example, the computing system may synchronize the synchronized first audio data with image data (e.g., one or images, a video, etc.) to obtain synchro-nized image data. In another example, the computing system may determine an active speaker, identify a computing device or image sensor associated with the active speaker, identify image data provided by the computing device or image sensor, and synchronize the synchronized first audio data with the image data (e.g., overlay the synchronized first audio data over the image data in a synchronized manner) such that it appears that the active speaker is speaking based on display of the transformed image data.

Based on the determined entity, at block 708, the com-puting system routes the transformed first audio data and an identifier of the entity. In some cases, the computing system may route the transformed image data. The computing system may route the transformed first audio data and the identifier of the entity to a device (e.g., a media management system) for transmission (e.g., routing) to another device. In some cases, the computing system may route the trans-formed first audio data and the identifier of the entity directly to a second device (e.g., a second computing device).

The computing system may route the transformed first audio data and the identifier of the entity to a media management system for transmission to a second device or directly to the second device based on the second device having one or more device parameters different from the one or more device parameters of the one or more first devices. For example, the one or more first devices may have one or more first device parameters indicating that the one or more first devices are located at the same location (e.g., a first location, in-room, etc.) within a first environment and/or are assigned a first role and the second device may have one or more second device parameters indicating that the second device is located at a different location (e.g., a second location, remote, etc.) within a second environment and/or assigned a second role. The computing system may not route the transformed first audio data and the identifier to the one or more first devices based on the one or more first devices having the same one or more first device parameters (e.g., indicating that the one or more first devices are located at the same location) as the devices providing the first audio data. The routine 700 then ends at block 710.

In various embodiments, the routine 700 may include more, fewer, different, or different combinations of blocks than those depicted in FIG. 7. For example, the routine 700 may, in some embodiments, include transformation of image data. As a further example, block 706 may be omitted and the computing system may not determine the entity. The routine 700 depicted in FIG. 7 is thus understood to be illustrative and not limiting.

Figure 8:
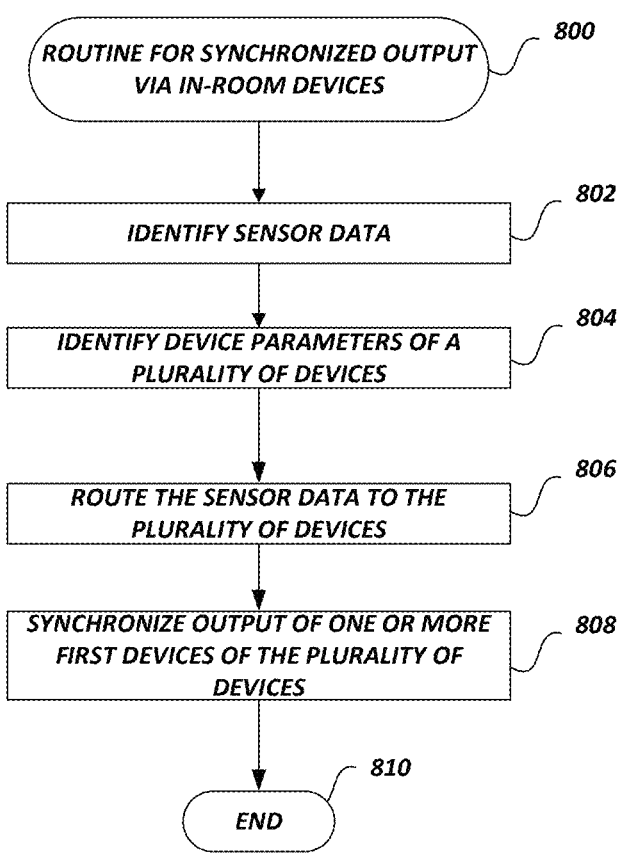
FIG. 8 depicts an illustrative routine for determining device parameters of devices and processing data to be routed to the devices according to the device parameters.

As discussed above, the computing system may process data routed to and/or obtained from a computing device based on device parameters associated with the computing device. With reference to FIG. 8, an illustrative routine 800 will be described for determining the device parameters and providing a synchronized output according to the device parameters indicating that a device providing the output is an in-room device. The routine 800 may be implemented for example, by the computing system 110 of FIG. 1. In some cases, the routine 800 may be implemented by a processor. The routine 800 begins at block 802, where the computing system identifies sensor data. For example, the sensor data may include audio data and/or image data. To identify the sensor data, the computing system may provide an output to a plurality of devices (e.g., including one or more first devices and one or more third devices) based on sensor data obtained from one or more second devices (e.g., one or more second computing devices, sensors, etc.). For example, the computing system may obtain sensor data from a plurality of out-of-room computing devices to provide to a plurality of in-room computing devices. In a further example, the computing system may obtain sensor data from a plurality of out-of-room computing devices and in-room computing devices to provide to at least a subset of the plurality of out-of-room computing devices and in-room computing devices.

In some cases, the computing system may obtain the sensor data from the media management system. For example, the media management system may obtain sensor data from the one or more second devices and provide the sensor data to the computing system. The computing system may determine that the sensor data is associated with the one or more second devices (e.g., captured by the one or more second devices).

In response to identifying the sensor data, at block 804, the computing system identifies device parameters of the plurality of devices. For example, the computing system may identify the device parameters based on input received from the plurality of devices (e.g., messages), sensor data associated with the plurality of devices (e.g., location data), and/or data stored by the computing system. All or a portion of the plurality of devices may correspond to (e.g., may be assigned) one or more respective parameters (e.g., a respective first set of device parameters). For example, the parameters may be device parameters (e.g., indicative of a location, a role, a position, a function, an assignment, etc. of a device providing and/or obtaining the data).

Based on the device parameters, at block 806, the computing system routes the sensor data (or an output based on the sensor data) to a plurality of devices (e.g., computing devices, output devices, etc.). In some cases, all or a portion of the plurality of devices may include a respective sensor and/or a respective output device. In some cases, the computing system may route the sensor data (or an output based on the sensor data) to the plurality of devices based on the one or more second devices being located at a second location different from one or more locations of the plurality of devices. The computing system may route the sensor data to the plurality of devices and instruct the plurality of devices to provide an output based on the sensor data (e.g., provide an output via an output device such as a speaker, a display, etc.).

Using the device parameters, the computing system may determine that the one or more first devices (e.g., one or more first computing devices, output devices, etc.) of the plurality of devices are associated with a particular (e.g., a first) location and one or more third devices (e.g., one or more third computing devices, output devices, etc.) of the plurality of devices are associated with a different (e.g., a second) location as compared to the first location. For example, the computing system may determine that the one or more third devices are out-of-room devices and the one or more first devices are in-room devices. In some cases, the one or more third devices may be located at a same location and within a same environment as the one or more second devices.

Based on the device parameters indicating that the one or more third devices are out-of-room devices, the computing system may not synchronize provision of the output via the one or more third devices.

In response to determining that the one or more first devices are associated with a particular location (e.g., are in-room devices), at block 808, the computing system synchronizes output of one or more first devices of the plurality of devices. The computing system may determine (e.g., generate) one or more timing signals indicating a timing of providing the output (e.g., a start and/or stop). The computing system may provide the one or more timing signals and the sensor data (or an output based on the sensor data) to each of the one or more first devices indicating how to provide an output (e.g., how to output images and/or audio) in a synchronized (e.g., synchronous) manner. Based on the one or more timing signals and the sensor data, each of the one or more first devices may provide an output in the synchronized (e.g., synchronous) manner (e.g., via one or more speakers, displays, etc.).

In some cases, the computing system may process (e.g., filter) the sensor data to generate processed sensor data (e.g., filtered audio data). For example, the computing system may filter the sensor data to remove audio data associated with the location of the one or more first devices (e.g., the in-room location) from the sensor data. The computing system may route the processed sensor data to the one or more first devices. In some cases, the computing system may process the sensor data based on a determined location of an entity associated with (e.g., using) the one or more first devices. For example, the computing system may process the sensor data such that when the processed sensor data is output by the one or more first devices, audio appears to be provided from a location directly in front of the entity using the respective device.

As discussed above, the computing system may obtain image data and/or audio data from the plurality of devices. For example, the computing system may obtain respective image data and/or respective audio data from all or a portion of the plurality of devices. As discussed above, the computing system may determine an entity associated with a respective device of the plurality of devices, identify (e.g., assign) a persona associated with the entity, identify persona parameters associated with the persona, process sensor data based on the persona parameters to generate an output, and route the output to the respective device. The routine 800 then ends at block 810.

In various embodiments, the routine 800 may include more, fewer, different, or different combinations of blocks than those depicted in FIG. 8. For example, the routine 800 may, in some embodiments, may not include routing of the sensor data to the one or more second devices. As a further example, block 804 may be omitted and the device parameters may not be identified. The routine 800 depicted in FIG. 8 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Various example embodiments of the disclosure can be described by the following clauses Clause 1: A system comprising:

a first computing device located within a first environment, wherein the first computing device is configured to:

obtain, from each of a plurality of first microphones located within the first environment, respective first audio data;

synchronize the respective first audio data, from each of the plurality of first microphones, to obtain synchronized first audio data based on the plurality of first microphones being located within the first environment;

determine an entity, of a plurality of entities, associated with the synchronized first audio data;

route a first output based on the synchronized first audio data and an identifier of the entity to a media management system for transmission to a second computing device based on the second computing device being located within a second environment different from the first environment, wherein the second computing device comprises a second microphone and a second speaker;

obtain, from the media management system, second audio data;

determine the second audio data is associated with the second computing device;

route a second output based on the second audio data to a plurality of first speakers located within the first environment based on the second computing device being located within the second environment; and synchronize the plurality of first speakers such that each of the plurality of first speakers provide the second output in a synchronous manner.

Clause 2: The system of Clause 1, further comprising:

a plurality of third computing devices located within the first environment, wherein each of the plurality of third computing devices comprises a respective microphone of the plurality of first microphones and a respective speaker of the plurality of first speakers.

Clause 3: The system of Clause 1, further comprising:
a plurality of third computing devices located within the first environment, wherein each of the plurality of third computing devices comprises a respective display of a plurality of first displays and a respective speaker of the plurality of first speakers, wherein the first computing device is further configured to:
obtain, from the media management system, image data;
determine the image data is associated with the second computing device; and
route a third output based on the image data to the plurality of third computing devices, wherein the plurality of third computing devices provide the third output via the plurality of first displays based on the second computing device being located within the second environment.

Clause 4: The system of Clause 1, further comprising:
a plurality of third computing devices located within the first environment, wherein each of the plurality of third computing devices comprises a respective image sensor of a plurality of first image sensors and a respective speaker of the plurality of first speakers, wherein the first computing device is further configured to:
obtain, from each of the plurality of first image sensors, respective image data, wherein to determine the entity, the first computing device is further configured to:
analyze the respective image data, from each of the plurality of first image sensors; and
identify the entity based on analyzing the respective image data, from each of the plurality of first image sensors.

Clause 5: A method comprising:
identifying first audio data associated with one or more first computing devices, wherein a location of the one or more first computing devices corresponds to a first location;
transforming the first audio data to obtain transformed first audio data based on the location of the one or more first computing devices corresponding to the first location; determining an entity, of a plurality of entities, associated with the transformed first audio data; and
routing the transformed first audio data and an identifier of the entity to a media management system for transmission to a second computing device based on the location of the one or more first computing devices corresponding to the first location, wherein a location of the second computing device corresponds to a second location.

Clause 6: The method of Clause 5, further comprising:
obtaining image data associated with the one or more first computing devices; and identifying the plurality of entities based on the image data.

Clause 7: The method of Clause 5, further comprising:
obtaining image data associated with the one or more first computing devices, wherein determining the entity is based on one or more of the image data or the first audio data.

Clause 8: The method of Clause 5, further comprising:
obtaining image data associated with the one or more first computing devices;
analyzing the image data; and
determining the identifier of the entity based on analyzing the image data.

Clause 9: The method of Clause 5, further comprising:
obtaining second audio data;
determining the second audio data is associated with the second computing device;
routing an output based on the second audio data to a plurality of speakers based on the location of the second computing device corresponding to the second location, wherein a location of the plurality of speakers corresponds to the first location; and
synchronizing the plurality of speakers such that each of the plurality of speakers provide the output in a synchronous manner.

Clause 10: The method of Clause 5, further comprising:
obtaining image data;
determining the image data is associated with the second computing device;
routing an output based on the image data to a plurality of displays based on the location of the second computing device corresponding to the second location, wherein a location of the plurality of displays corresponds to the first location; and
causing display of the output via the plurality of displays in a synchronous manner.

Clause 11: The method of Clause 5, further comprising:
obtaining second audio data;
obtaining image data;
determining the second audio data and the image data are associated with the second computing device;
routing an output based on the second audio data and the image data to the one or more first computing devices based on the location of the second computing device corresponding to the second location; and
synchronizing the one or more first computing devices to provide the output in a synchronous manner.

Clause 12: The method of Clause 5, further comprising:
obtaining second audio data;
filtering the second audio data to remove audio data associated with the first location from the second audio data and to obtain filtered audio data; and
routing an output based on the filtered audio data to a plurality of speakers based on filtering the second audio data, wherein a location of the plurality of speakers corresponds to the first location.

Clause 13: The method of Clause 5, wherein transforming the first audio data comprises:
synchronizing a first portion of the first audio data to a second portion of the first audio data.

Clause 14: The method of Clause 5, wherein transforming the first audio data comprises:
providing the first audio data to a machine learning model; and
obtaining an output of the machine learning model, wherein the output comprises the transformed first audio data.

Clause 15: The method of Clause 5, wherein transforming the first audio data comprises one or more of:
performing echo cancellation; or
performing noise suppression.

Clause 16: Non-transitory computer-readable media including computer-executable instructions that, when executed by a processor, cause the processor to:
identify sensor data associated with one or more first computing devices, wherein the one or more first computing devices corresponds to a first set of parameters;

transform the sensor data to obtain transformed sensor data based on the one or more first computing devices corresponding to the first set of parameters;

determine an entity, of a plurality of entities, associated with the transformed sensor data;

link the transformed sensor data and the entity; and route the transformed sensor data to a second computing device based on the one or more first computing devices corresponding to the first set of parameters and the second computing device corresponding to a second set of parameters.

Clause 17: The non-transitory computer-readable media of Clause 16, wherein the first set of parameters comprises one or more of a first location or a first role, and wherein the second set of parameters comprises one or more of a second location or a second role.

Clause 18: The non-transitory computer-readable media of Clause 16, wherein the first set of parameters comprises one or more of a first location or a first role, wherein the second set of parameters comprises one or more of a second location or a second role, wherein execution of the computer-executable instructions by the processor further causes the processor to:

determine the one or more first computing devices are in-room computing devices based on the first set of parameters; and determine the second computing device is a remote computing device based on the second set of parameters.

Clause 19: The non-transitory computer-readable media of Clause 16, wherein the sensor data comprises at least one of audio data or image data.

Clause 20: The non-transitory computer-readable media of Clause 16, wherein to route the transformed sensor data to the second computing device, execution of the computer-executable instructions by the processor further causes the processor to:

route the transformed sensor data to the second computing device for transmission to a third computing device associated with a third location.

Various example embodiments of the disclosure can be described by the following clauses Clause 1: A system comprising:

a first computing device configured to:

determine initiation of a first connection between the first computing device and a second computing device;

obtain first image data associated with the second computing device based on determining initiation of the first connection;

identify a first entity within the first image data;

obtain, from a data store, entity data, wherein the entity data indicates one or more entities, wherein the entity data further indicates, for each of the one or more entities, a respective persona, of one or more personas, assigned to the entity;

for each of the one or more entities:

determine a correspondence between the first entity and the entity; and determine whether the correspondence between the first entity and the entity is greater than or matches a threshold value;

identify a second entity, from the one or more entities, based on determining whether the correspondence between the first entity and the entity is greater than or matches the threshold value for each of the one or more entities;

determine a first persona, of the one or more personas, is assigned to the second entity;

assign the first persona to the first entity based on determining the first persona is assigned to the second entity;

identify a first persona identifier associated with the first persona;

route the first persona identifier to a media management system for transmission to a third computing device based on assigning the first persona to the first entity;

obtain second image data associated with the third computing device;

dynamically adjust the second image data based on the first persona to obtain first dynamically adjusted image data; and cause display, via the second computing device, of the first dynamically adjusted image data based on assigning the first persona to the first entity.

Clause 2: The system of Clause 1, wherein to determine whether the correspondence is greater than or matches the threshold value, the first computing device is further configured to:

determine a correspondence between the first entity and a third entity of the one or more entities is less than the threshold value; and determine a correspondence between the first entity and the second entity is greater than or matches the threshold value, wherein to identify the second entity, the first computing device is further configured to identify the second entity further based on determining the correspondence between the first entity and the second entity is greater than or matches the threshold value.

Clause 3: The system of Clause 1, wherein the first computing device is further configured to:

determine initiation of a second connection between the first computing device and a fourth computing device;

obtain third image data associated with the fourth computing device based on determining initiation of the second connection;

identify a third entity within the third image data;

for each of the one or more entities:

determine a correspondence between the third entity and the entity; and determine whether the correspondence between the third entity and the entity is greater than or matches the threshold value;

identify a fourth entity, from the one or more entities, based on determining whether the correspondence between the third entity and the entity is greater than or matches the threshold value for each of the one or more entities;

determine a second persona, of the one or more personas, is assigned to the fourth entity;

assign the second persona to the third entity based on determining the second persona is assigned to the fourth entity;

identify a second persona identifier associated with the second persona;

route the second persona identifier to the media management system for transmission to the third computing device based on assigning the second persona to the third entity;

dynamically adjust the second image data based on the second persona to obtain second dynamically adjusted image data; and cause display, via the fourth computing device, of the second dynamically adjusted image data based on assigning the second persona to the third entity.

Clause 4: The system of Clause 1, wherein the first computing device is further configured to:

update the entity data based on assigning the first persona to the first entity.

Clause 5: A method comprising:

obtaining, via a first computing device, first image data based on a first connection with the first computing device;

identifying a first entity within the first image data;

obtaining, from a data store, entity data, wherein the entity data indicates one or more entities, wherein the entity data further indicates, for each of the one or more entities, a respective persona, of one or more personas, assigned to the entity;

identifying a second entity based on a comparison of the first entity to the one or more entities, wherein a persona is assigned to the second entity;

assigning the persona to the first entity;

routing a persona identifier associated with the persona to a media management system for transmission to a second computing device based on a second connection with the second computing device and assigning the persona to the first entity;

obtaining second image data;

dynamically adjusting the second image data based on the persona to obtain dynamically adjusted image data; and causing display, via the first computing device, of the dynamically adjusted image data based on assigning the persona to the first entity.

Clause 6: The method of Clause 5, further comprising:

obtaining, via the first computing device, third image data;

dynamically adjusting the third image data based on the persona to obtain second dynamically adjusted image data; and routing the second dynamically adjusted image data to the media management system for transmission to the second computing device based on assigning the persona to the first entity.

Clause 7: The method of Clause 5, further comprising:

determining one or more parameters associated with the persona; and providing the one or more parameters to the first computing device, wherein the dynamically adjusted image data is further adjusted based on the one or more parameters.

Clause 8: The method of Clause 5, further comprising:

determining one or more parameter values associated with the persona; and automatically adjusting one or more parameters of the first computing device based on the one or more parameter values.

Clause 9: The method of Clause 5, further comprising:

identifying audio data;

determining the audio data is associated with the first entity; and routing third image data associated with the first entity and the persona identifier to the media management system for transmission to the second computing device based on determining the audio data is associated with the first entity.

Clause 10: The method of Clause 5, further comprising:

comparing the first entity to the one or more entities, wherein the one or more entities comprises the second entity.

Clause 11: The method of Clause 5, further comprising:

comparing the first entity to the one or more entities;

determining a correspondence between the first entity and each of the one or more entities is less than or equal to a threshold value; and comparing the first entity to one or more second entities based on determining the correspondence between the first entity and each of the one or more entities is less than or equal to the threshold value, wherein the one or more second entities comprises the second entity, wherein identifying the second entity is further based on comparing the first entity to the one or more second entities.

Clause 12: The method of Clause 5, further comprising:

comparing the first entity to the one or more entities; and determining a correspondence between the first entity and each of the one or more entities is less than or equal to a threshold value, wherein identifying the second entity is further based on determining the correspondence between the first entity and each of the one or more entities is less than or equal to the threshold value, wherein the persona comprises a guest persona.

Clause 13: The method of Clause 5, further comprising:

comparing the first entity to the one or more entities;

determining a correspondence between the first entity and each of the one or more entities is less than or equal to a threshold value, wherein identifying the second entity is further based on determining the correspondence between the first entity and each of the one or more entities is less than or equal to the threshold value, wherein the persona comprises a guest persona; and causing display, via the first computing device, of a user interface, wherein the user interface comprises a sign-on screen.

Clause 14: The method of Clause 5, further comprising:

comparing the first entity to the one or more entities;

determining a correspondence between the first entity and each of the one or more entities is less than or equal to a threshold value;

causing display of a user interface based on determining the correspondence between the first entity and each of the one or more entities is less than or equal to the threshold value, wherein the user interface comprises a sign-on screen; and obtaining input via the user interface, wherein identifying the second entity is further based on the input.

Clause 15: The method of Clause 5, further comprising:

obtaining an input, wherein the input indicates a subset of a plurality of entities, the subset of the plurality of entities corresponding to the one or more entities;

generating the entity data based on the input; and storing the entity data in the data store.

Clause 16: Non-transitory computer-readable media including computer-executable instructions that, when executed by a processor, cause the processor to:

obtain, via a first computing device, first image data;

identify a first figure within the first image data;

assign a first persona to the first figure based on a comparison of the first image data to second image data;

generate third image data based on assigning the first persona to the first figure;

cause display of the third image data;

obtain, via a second computing device, fourth image data;

dynamically adjust the fourth image data based on the first persona to obtain dynamically adjusted image data; and cause display, via the first computing device, of the dynamically adjusted image data based on assigning the first persona to the first figure.

Clause 17: The non-transitory computer-readable media of Clause 16, wherein the second image data indicates a label associated with the first persona, wherein execution of the computer-executable instructions by the processor, further cause the processor to:

identify a second figure within the second image data based on the comparison of the first image data to the second image data, wherein the first persona is assigned to the second figure.

Clause 18: The non-transitory computer-readable media of Clause 16, wherein execution of the computer-executable instructions by the processor further causes the processor to:

identify a third figure within the first image data;

identify a fourth figure within the second image data based on the comparison of the first image data to the second image data, wherein a second persona is assigned to the fourth figure; and assign the second persona to the third figure, wherein to generate the third image data, the execution of the computer-executable instructions further causes the processor to generate the third image data further based on assigning the second persona to the third figure.

Clause 19: The non-transitory computer-readable media of Clause 16, wherein the first image data comprises an image frame indicative of the first figure, wherein the second image data comprises a plurality of image frames, and wherein each of the plurality of image frames is indicative of a respective figure of a plurality of figures.

Clause 20: The non-transitory computer-readable media of Clause 16, wherein the first image data comprises an image frame indicative of the first figure, wherein the second image data comprises a plurality of image frames, wherein each of the plurality of image frames is indicative of a respective figure of a plurality of figures, and wherein execution of the computer-executable instructions by the processor further causes the processor to:

compare the image frame to the plurality of image frames, wherein the comparison of the first image data to the second image data is based on comparing the image frame to the plurality of image frames.

What is claimed is:

1. A system comprising:

a first computing device configured to:

determine initiation of a first connection for a first video conference between the first computing device and a second computing device;

obtain first video conference data from the second computing device based on determining initiation of the first connection;

determine that the first video conference data depicts a first individual;

obtain, from a data store, image data that associates individual personas, of a plurality of personas, to identification data enabling identification of images associated with individual personas;

using the image data, determine that the first individual depicted in the first video conference data is associated with a first persona of the plurality of personas;

identify a first persona identifier associated with the first persona;

route the first persona identifier to a media management system for transmission to a third computing device;

obtain second video conference data associated with the third computing device;

based on preference data associated with the first persona, dynamically adjust the second video conference data to obtain first dynamically adjusted video conference data; and cause display, via the second computing device, of the first dynamically adjusted video conference data.

2. The system of claim 1, wherein the first computing device is further configured to:

determine a correspondence between the first individual depicted in the first video conference data and a second individual depicted in the image data is greater than or matches a threshold value, wherein the image data indicates the second individual is associated with the first persona, wherein determining that the first individual depicted in the first video conference data is associated with the first persona is based on determining the correspondence between the first individual and the second individual is greater than or matches the threshold value.

3. The system of claim 1, wherein the first computing device is further configured to:

determine initiation of a second connection for a second video conference between the first computing device and a fourth computing device;

obtain third video conference data from the fourth computing device based on determining initiation of the second connection;

determine that the second video conference data depicts a second individual;

using the image data, determine the second individual depicted in the second video conference data is associated with a second persona of the plurality of personas;

identify a second persona identifier associated with the second persona;

route the second persona identifier to the media management system for transmission to the third computing device;

based on preference data associated with the second persona, dynamically adjust the third video conference data to obtain second dynamically adjusted video conference data; and cause display, via the fourth computing device, of the second dynamically adjusted video conference data.

4. The system of claim 1, wherein the first computing device is further configured to:

update the image data to indicate a particular persona is associated with a particular individual based on an input.

5. A method comprising:

obtaining first video conference data from a first computing device associated with a video conference;

determining that the first video conference data depicts a first individual;

obtaining, from a data store, image data that associates individual personas, of a plurality of personas, to identification data enabling identification of images associated with individual personas;

using the image data, identifying the first individual depicted in the first video conference data as associated with a first persona of the plurality of personas;

routing a persona identifier associated with the first persona to a media management system for transmission to a second computing device;

obtaining second video conference data from the second computing device;

based on preference data associated with the first persona, dynamically adjusting the second video conference data to obtain dynamically adjusted video conference data; and causing display, via the first computing device, of the dynamically adjusted video conference data.

6. The method of claim 5, further comprising:

obtaining, third video conference data from the first computing device;

based on the preference data associated with the first persona, dynamically adjusting the third video conference data to obtain second dynamically adjusted video conference data; and routing the second dynamically adjusted video conference data to the media management system for transmission to the second computing device.

7. The method of claim 5, further comprising:

determining one or more parameters associated with the first persona; and providing the one or more parameters to the first computing device, wherein the dynamically adjusted video conference data is further adjusted based on the one or more parameters.

8. The method of claim 5, further comprising:

determining one or more parameter values associated with the first persona; and automatically adjusting one or more parameters of the first computing device based on the one or more parameter values.

9. The method of claim 5, further comprising:

identifying audio data;

determining the audio data is associated with the first individual; and routing third video conference data associated with the first individual and the persona identifier to the media management system for transmission to the second computing device based on determining the audio data is associated with the first individual.

10. The method of claim 5, further comprising:

comparing an image of the first individual from the first video conference data to a plurality of images of the image data.

11. The method of claim 5, further comprising:

comparing an image of the first individual from the first video conference data to a first plurality of images of the image data;

determining a correspondence between the image of the first individual and each image of the first plurality of images is less than or equal to a threshold value; and comparing the image of the first individual to a second plurality of images based on determining the correspondence between the image of the first individual and each image of the first plurality of images is less than or equal to the threshold value.

12. The method of claim 5, further comprising:

comparing an image of the first individual from the first video conference data to a first plurality of images of the image data; and determining a correspondence between the image of the first individual and each image of the first plurality of images is less than or equal to a threshold value, wherein the first persona comprises a guest persona.

13. The method of claim 5, further comprising:

comparing an image of the first individual from the first video conference data to a first plurality of images of the image data;

determining a correspondence between the image of the first individual and each image of the first plurality of images is less than or equal to a threshold value, wherein the first persona comprises a guest persona; and causing display, via the first computing device, of a user interface, wherein the user interface comprises a sign-on screen.

14. The method of claim 5, further comprising:

comparing an image of the first individual from the first video conference data to a first plurality of images of the image data;

determining a correspondence between the image of the first individual and each image of the first plurality of images is less than or equal to a threshold value;

causing display of a user interface based on determining the correspondence between the image of the first individual and each image of the first plurality of images is less than or equal to the threshold value, wherein the user interface comprises a sign-on screen; and obtaining input via the user interface, wherein identifying the first individual depicted in the first video conference data as associated with the first persona is based on the input.

15. The method of claim 5, further comprising:

obtaining an input;

generating the image data based on the input; and storing the image data in the data store.

16. Non-transitory computer-readable media including computer-executable instructions that, when executed by a processor, cause the processor to:

obtain first video conference data from a first computing device associated with a video conference;

determine that the first video conference data depicts a first individual;

identify the first individual depicted in the first video conference data as associated with a first persona;

generate second video conference data based on identifying the first individual depicted in the first video conference data as associated with the first persona;

cause output of the second video conference data;

obtain third video conference data from a second computing device;

based on preference data associated with the first persona, dynamically adjust the third video conference data to obtain dynamically adjusted video conference data; and cause display, via the first computing device, of the dynamically adjusted video conference data.

17. The non-transitory computer-readable media of claim 16, wherein execution of the computer-executable instructions by the processor, further cause the processor to:

obtain image data, wherein the image data indicates the first individual and a label indicating the first persona as associated with the first individual, wherein identifying the first individual depicted in the first video conference data as associated with the first persona is based on the image data.

18. The non-transitory computer-readable media of claim 16, wherein execution of the computer-executable instructions by the processor further causes the processor to:

determine that the first video conference data depicts a second individual; and identify the second individual depicted in the first video conference data as associated with a second persona, wherein to generate the second video conference data, the execution of the computer-executable instructions further causes the processor to generate the second video conference data further based on identifying the second individual depicted in the first video conference data as associated with the second persona.

19. The non-transitory computer-readable media of claim 16, wherein the first video conference data comprises an image frame indicative of the first individual, wherein identifying the first individual depicted in the first video conference data as associated with the first persona is based on a plurality of image frames that associate individual personas, of a plurality of personas, to identification data enabling identification of images associated with individual personas.

20. The non-transitory computer-readable media of claim 16, wherein the first video conference data comprises an image frame indicative of the first individual and wherein execution of the computer-executable instructions by the processor further causes the processor to:

compare the image frame to a plurality of image frames, wherein each image frame of the plurality of image frames associates individual personas, of a plurality of personas, to identification data enabling identification of images associated with individual personas, wherein identifying the first individual depicted in the first video conference data as associated with the first persona is based on comparing the image frame to the plurality of image frames.

* * * * *